(12) United States Patent
Proulx

(10) Patent No.: US 7,513,046 B2
(45) Date of Patent: *Apr. 7, 2009

(54) TRIMMER HEAD FOR USE IN FLEXIBLE LINE ROTARY TRIMMERS HAVING IMPROVED LINE LOADING MECHANISM

(75) Inventor: Richard A. Proulx, Alta Loma, CA (US)

(73) Assignee: Proulx Manufacturing, Inc., Rancho Cucamonga, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 11/133,404

(22) Filed: May 19, 2005

(65) Prior Publication Data

US 2005/0217120 A1  Oct. 6, 2005

Related U.S. Application Data

(63) Continuation-in-part of application No. 10/933,486, filed on Sep. 3, 2004, now Pat. No. 7,275,324, which is a continuation-in-part of application No. 10/677,700, filed on Oct. 2, 2003, now Pat. No. 6,901,667.

(51) Int. Cl.
*A01D 34/416* (2006.01)

(52) U.S. Cl. .......................... 30/276; 30/347
(58) Field of Classification Search ................... 30/276, 30/347; 56/12.7, 295
See application file for complete search history.

(56) References Cited

U.S. PATENT DOCUMENTS

| | | | |
|---|---|---|---|
| 4,020,552 A * | 5/1977 | Mizuno et al. | ................. 30/276 |
| 4,035,912 A | 7/1977 | Ballas et al. | |
| 4,067,108 A | 1/1978 | Ballas | |
| 4,091,538 A * | 5/1978 | Akiyama | ..................... 30/276 |
| 4,177,561 A | 12/1979 | Ballas | |
| 4,203,212 A | 5/1980 | Proulx | |
| 4,259,782 A | 4/1981 | Proulx | |
| 4,458,419 A | 7/1984 | Proulx | |
| 4,959,904 A | 10/1990 | Proulx | |
| 5,490,641 A | 2/1996 | Worthing | |
| 5,659,960 A | 8/1997 | Everts et al. | |
| 5,671,536 A | 9/1997 | Everts et al. | |
| 5,749,148 A * | 5/1998 | White et al. | ................. 30/276 |
| 5,806,192 A | 9/1998 | Everts et al. | |
| 6,148,523 A | 11/2000 | Everts et al. | |
| 6,263,580 B1 | 7/2001 | Stark et al. | |

(Continued)

*Primary Examiner*—Hwei-Siu C Payer
(74) *Attorney, Agent, or Firm*—Holland & Knight LLP; Richard E. Lyon, Jr.

(57) ABSTRACT

A trimmer head for use in a flexible line rotary trimmer including a housing adapted to be operatively connected to the trimmer to effect rotation of the head and a spool operatively connected to the housing for rotation therewith. The spool defines at least one inwardly extending line receptor channel, preferably formed by a plurality of inwardly tapered walls so as to be polygonal in cross-section. So configured, the channel walls will securely grip the cutting line upon the line being inserted in the channel and wound about the spool. To provide uniform winding of the line, a plurality of cam, cam abutment and sliding surfaces are operatively connected to the housing and spool such that when the spool is manually rotated relative to the housing in the drive direction, the spool is caused to reciprocate axially within the housing evenly distributing the line about the body of the spool.

55 Claims, 25 Drawing Sheets

U.S. PATENT DOCUMENTS

| | | |
|---|---|---|
| 6,581,292 B2 | 6/2003 | Allis |
| 6,735,874 B2 * | 5/2004 | Iacona .......................... 30/276 |
| 6,901,667 B2 * | 6/2005 | Proulx .......................... 30/276 |
| 6,952,877 B2 * | 10/2005 | Pfaltzgraff .................... 30/276 |
| 2004/0134078 A1 | 7/2004 | Pfaltzgraff |
| 2005/0252009 A1 * | 11/2005 | Alliss .......................... 30/276 |

* cited by examiner

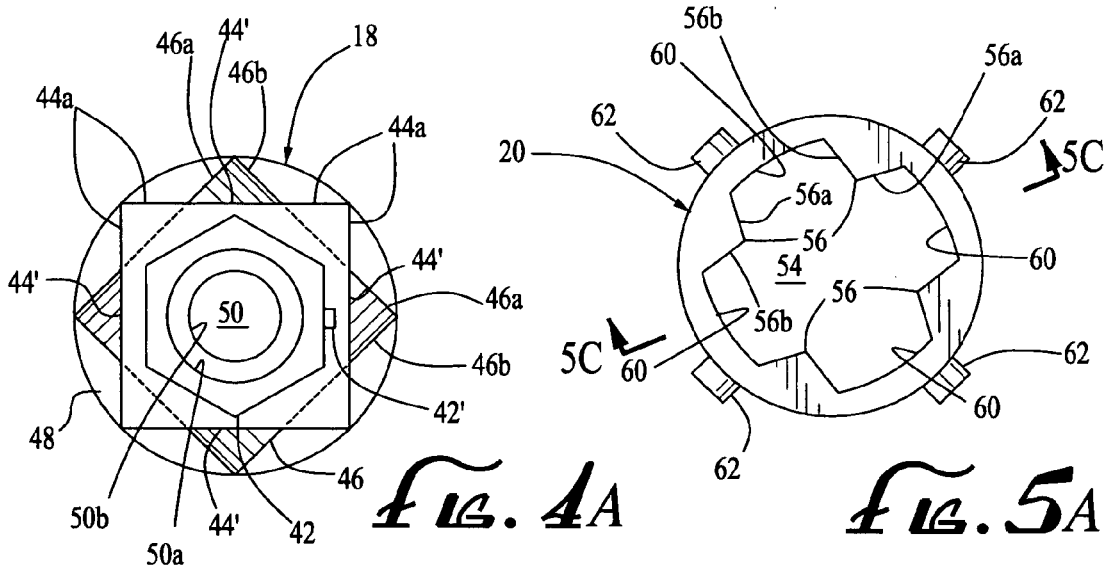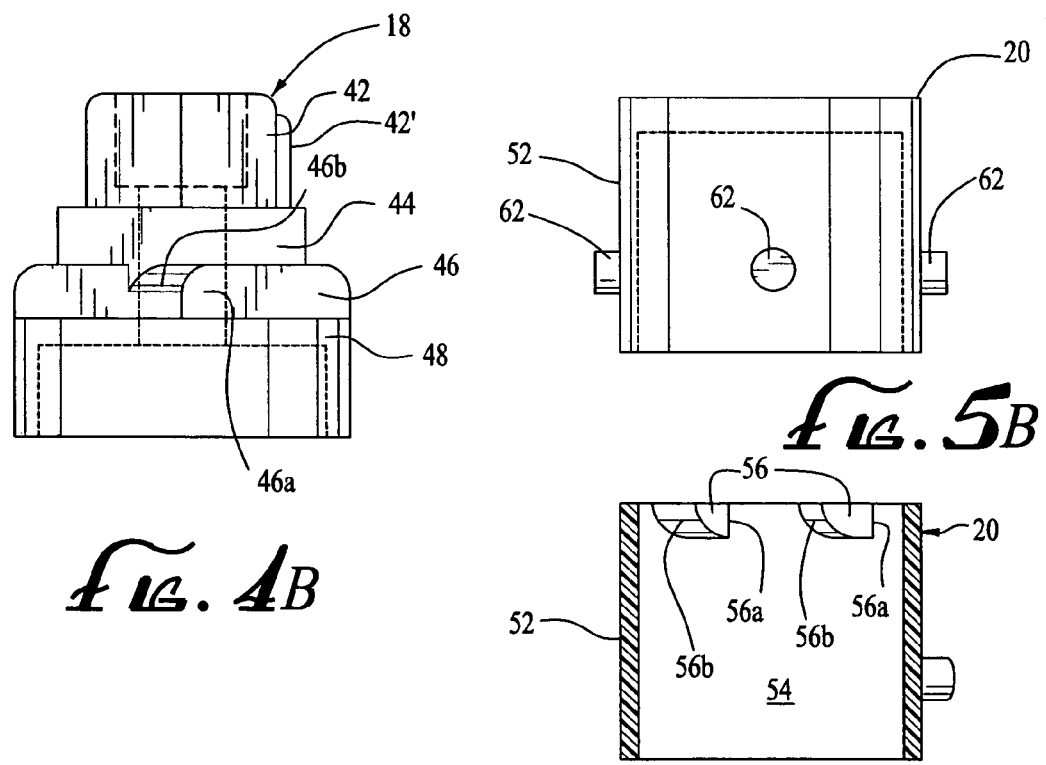

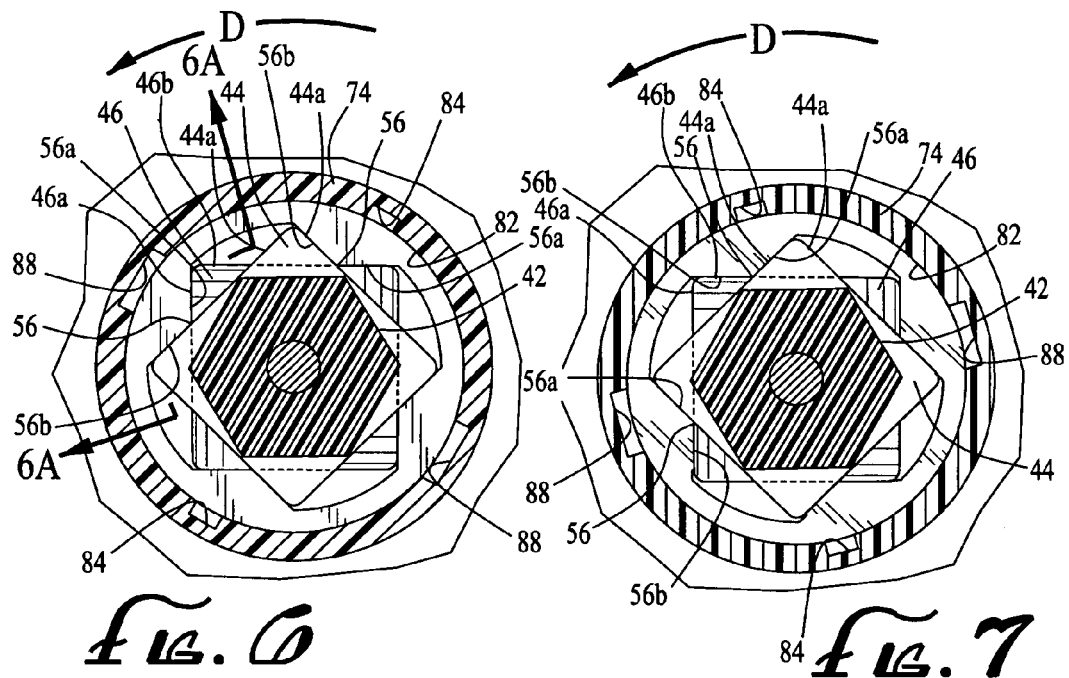
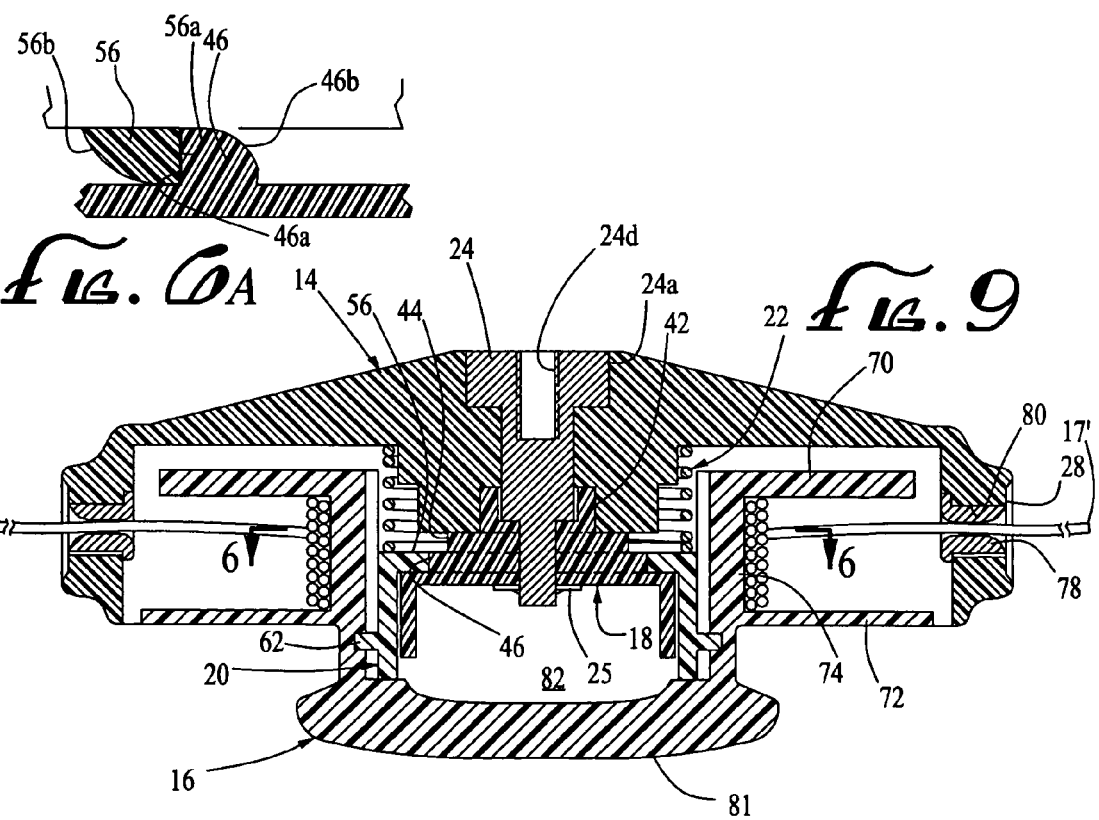

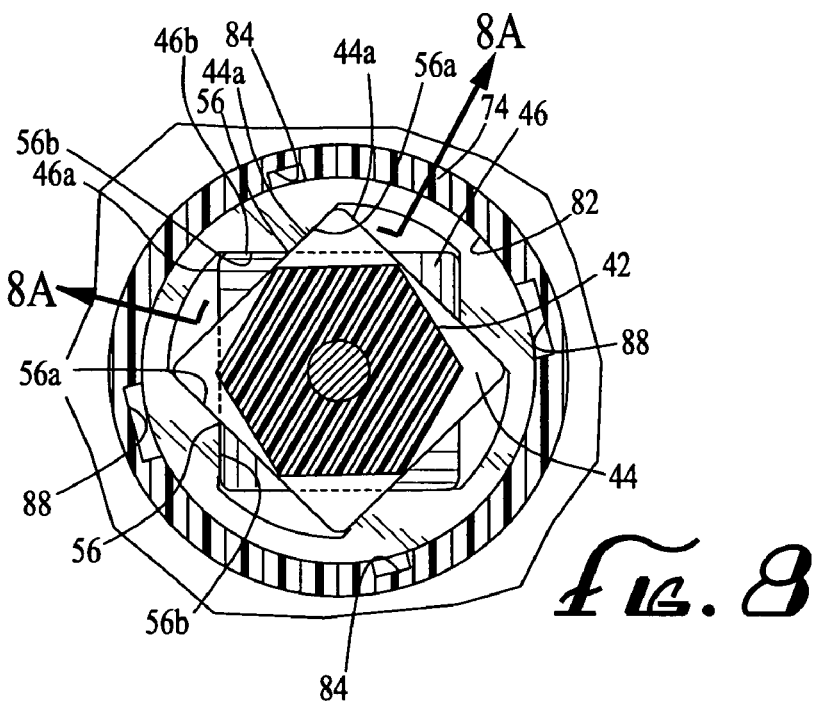
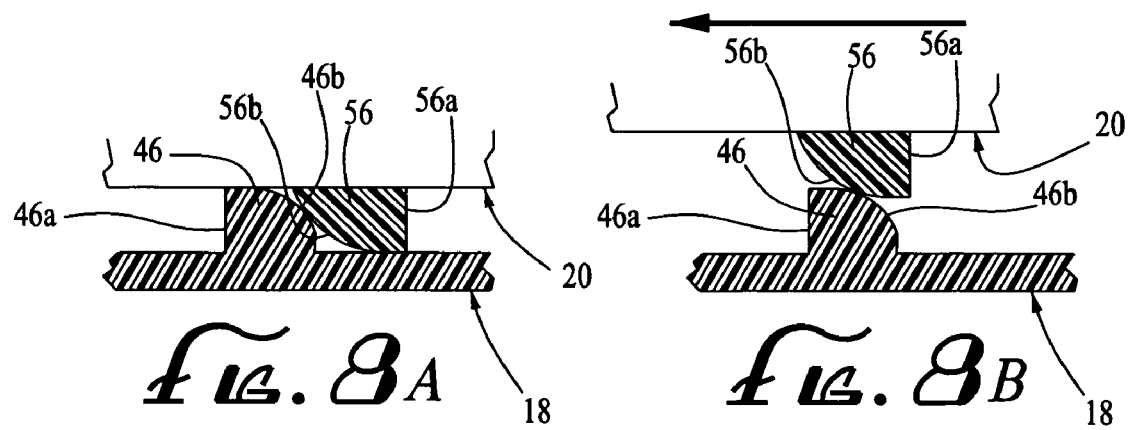

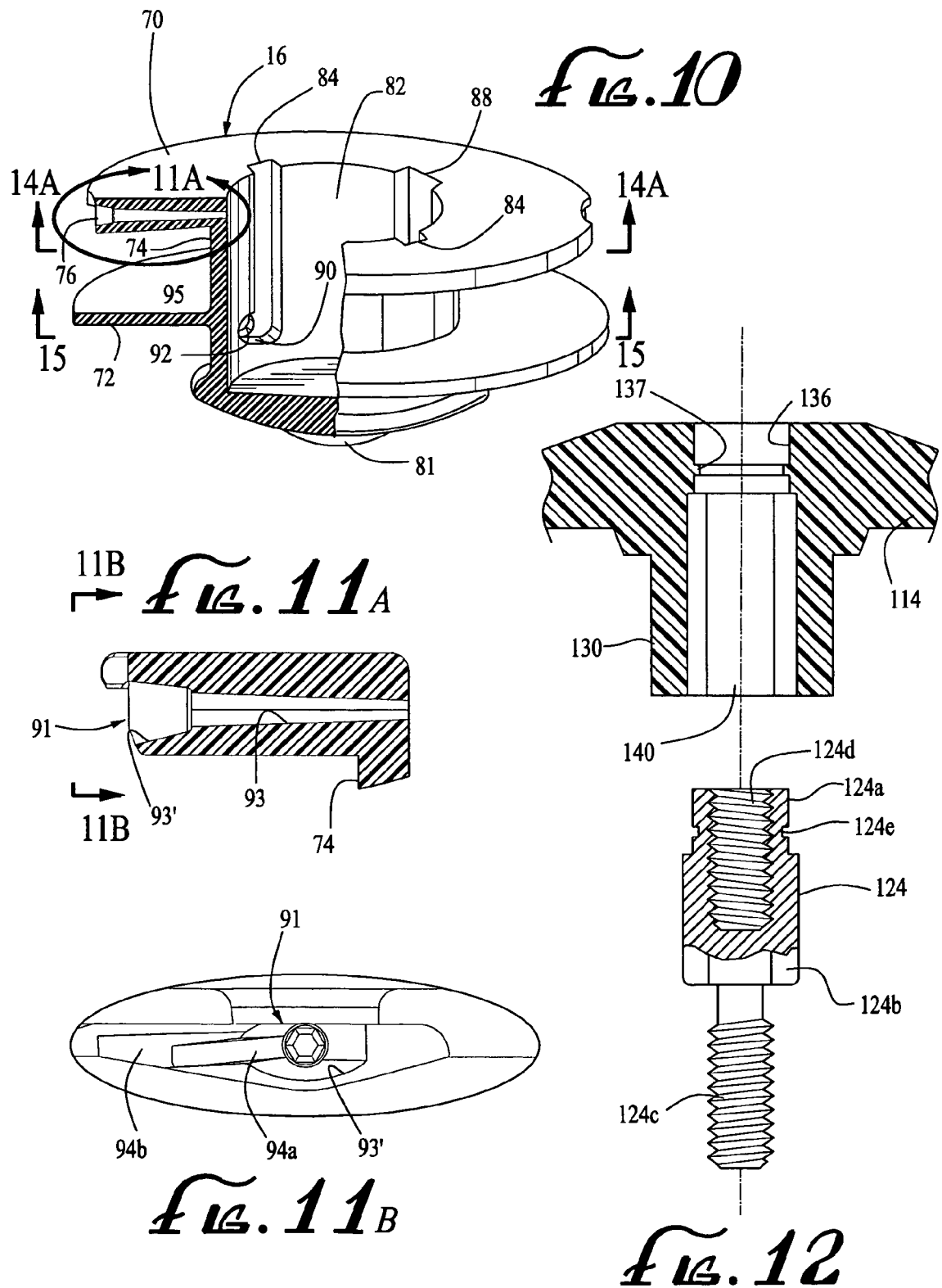

TRIMMER HEAD FOR USE IN FLEXIBLE LINE ROTARY TRIMMERS HAVING IMPROVED LINE LOADING MECHANISM

CROSS-REFERENCE TO RELATED APPLICATIONS

This is a continuation-in-part of U.S. patent application Ser. No. 10/933,486, filed Sep. 3, 2004, now U.S. Pat. No. 7,275,324, issued Oct. 2, 2007 and entitled "Trimmer Head for Use in Flexible Line Rotary Trimmers Having Improved Line Loading Mechanism" which is a continuation-in-part of U.S. patent application Ser. No. 10/677,700, filed Oct. 2, 2003, now U.S. Pat. No. 6,901,667, issued Jun. 7, 2005 and entitled "Trimmer Head for Use in Flexible Line Rotary Trimmers."

BACKGROUND OF THE INVENTION

The present invention relates to an improved trimmer head for use in flexible line rotary trimming devices used to trim grass, weeds and other vegetation. More particularly, the invention is directed to an improvement in the line loading of both "bump-feed" type trimmer heads such as those disclosed in U.S. Pat. Nos. 4,458,419 and 4,959,904 and the more simple manually operated heads such as that disclosed in U.S. Pat. No. 4,145,809, the contents of said patents being incorporated herein by reference as though fully set forth below.

Trimmer heads used in flexible line rotary trimmers generally carry one or two lengths of flexible nylon cutting line wrapped about an interior spool with the ends of the line or lines projecting outwardly through opposed apertures in the side wall of the trimmer head. The head is threadably mounted on the end of an elongated shaft and rotated at a high velocity by a gas or electric motor so that the ends of the cutting line project radially from the head and sever weeds or other vegetation. When cutting line projecting from the head breaks off or becomes overly worn, it must be severed and fresh line extended from the spool through the line outlet eyelets in the side of the housing. Bump-feed type heads include a line feed-out mechanism which responds to a bump on the ground intentionally applied by the operator to feed out a measured length of fresh cutting line which is typically cut to the desired length by a knife blade projecting from a shield attached to the trimmer above the cutting head and spaced a predetermined distance from the perimeter of the trimmer head housing. Manual heads do not include any such line feed-out mechanism. A fastening nut that holds the housing portion of the trimmer head to the spool must be loosened so that the spool can be separated from the housing and manually rotated relative to the housing to pay out additional cutting line. The spool and housing are then re-secured by the fastening member.

In both bump-feed and manual heads, the length or lengths of cutting line are typically wound onto the spool by hand. As most cutting heads employ two lengths of line projecting from opposed sides of the cutting head, care must be taken during the winding of the spool to avoid crossing or otherwise tangling of the two lines within the spool which interferes with the paying out of fresh line. This is particularly important in bump-feed heads where centrifugal force is utilized to pull the new lengths of line from the spool during use as the head is being bumped against the ground as any line tangle will interfere with the proper feeding of the line. Difficulty in properly loading the line on the spool is the most common complaint of home users of flexible line trimmers. It also is a time consuming task for the professional user.

The early bump-feed mechanisms typically consisted of a dog or friction clutch located between the spool of line and the surrounding housing. By bumping an extension of the spool on the ground, or other fixed object, the friction clutch was temporarily disengaged for a length of time dependant on the duration of the bump. The dog clutch released by the bump then abruptly engaged at the next opportunity to feed out line in segment lengths which were related to the engagement points of the dog clutch. Such dog clutches had outwardly extending ribs which engaged inwardly extending abutment tangs and therefore depended upon a skillful bump when it was desired to deliver only one segment length. However, friction within such devices and overzealous bumping often resulted in two or more line segments being fed out, particularly especially when the device has been in use and the corners on the ribs and tangs became worn such that positive engagement was no longer assured. The unavoidable abrupt operation of the dog clutch caused such wear to occur.

A bump-feed-out mechanism was subsequently developed that automatically fed out a predetermined length of line with each bump, regardless of the duration of the bump, and which did not lose this ability with extended use. That device is disclosed in and is the subject of the incorporated reference, U.S. Pat. No. 4,458,419. As described therein in detail, the improved trimmer head contained a spool holding one or more coils of cutting line and a simplified mechanism that selectively allowed relative movement of the spool with respect to the housing in response to bumping of the head on the ground to pay out measured lengths of line. The simplified pay-out mechanism included a novel spring-loaded cam and cam follower arrangement in which the cam follower included two pair of diametrically opposed and generally inwardly facing abutment surfaces arrayed about the axis of rotation of the trimmer housing. The abutment surfaces were thus spaced 90° apart and were carried by a depending cylindrical wall that circumscribed an interior chamber. The cam member was disposed within the chamber in threaded engagement with the extended lower end of the drive bolt of the trimmer housing and defined two vertically adjacent cams, each cam being of a square configuration and defining four perpendicularly disposed cam surfaces adapted to engage the abutment surfaces on the cam follower. The upper cam was rotationally offset 45° from the lower cam.

In operation, the housing was rotationally driven by the drive bolt through a connection between the upper end of the bolt and the trimmer drive means. The housing and cam member was thus driven by the drive bolt, which in turn drove the cam follower and the spool mounted thereon due to the engagement between the cam surfaces on the cam member and the abutment surfaces on the cam follower. The line carrying spool was disposed about the cylindrical wall of the cam follower and attached thereto via a pair of opposed outwardly projecting studs on the cam follower member that extend into slots formed in the inner portion of the spool. The spool was provided with a bumper at its lower end such that when the bumper was pressed against or bumped on the ground, the housing moved downwardly with respect to the spool against the force of a spring, disengaged the lower cam from the abutment surfaces on the cam follower and allowed the cam member to rotate 45° relative to the cam follower, whereupon the cam surfaces of the upper cam would abut the abutment surfaces on the cam follower. That imparted a similar degree of relative rotation between the spool and the housing. Once the force of the bump was dissipated, the spring loading forced the spool and housing back to their relative positions, which released the cam surfaces on the upper cam from the cam follower abutment surfaces and allowed another 45° of relative rotation of the cam member and cam follower and thus of the spool and housing, for a total of 90° of rotation per bump, which provided the predetermined relative rotation between the housing and spool needed to pay out a desired length of line through the apertures in the trimmer housing. Since the cams interacted with simple, inwardly facing cam follower surfaces formed only on a single level, the release mechanism was deemed relatively economical to manufacture and, due to the large abutment surface areas presented between the cams and cam follower, the device was durable, trouble free and reliable.

Because of early difficulties in molding some of the components of the cutting head disclosed in U.S. Pat. No. 4,458,419, the head became more expensive to manufacture than anticipated. New material developments subsequently reduced the cost of manufacture. In the meantime, however, a similar bump-feed drive mechanism was developed in which large square cams were formed on the upper and lower outer radial surfaces of the spool and the corresponding cam followers were formed by upper and lower portions of the housing which surrounded the spool. Such a head is disclosed in the incorporated reference, U.S. Pat. No. 4,959,904, and is still in production.

Over the years, with increasing competition from offshore manufacturers, it became clear that even with the development of new materials the earlier bump-feed mechanism covered by U.S. Pat. No. 4,459,419 was not as economical to manufacture as earlier believed. It contained several parts, some of which had to be hand assembled. In addition, vibration, the threaded engagement between the cam member and the drive bolt, and the heat generated by the trimmer required the use of a chemical bonding agent having a high melting point to prevent the cam member and cam follower from breaking loose from the drive bolt. Such agents, however, had extremely high break way torques, rendering the threaded connection effectively permanent. As a result, certain components of the head could not be replaced when worn. Thus, that head was significantly modified so as to retain all of the advantages of its predecessor yet utilize fewer component parts and obviate the need for any hand assembly and use of chemical bonding. That modification is the subject of a pending U.S. patent application entitled "Trimmer Head for Use in Flexible Line Rotary Trimmers", filed Oct. 2, 2003 and identified by Ser. No. 10/677,700, of which this application is a continuation-in-part. The bump-feed and manual heads of the present invention retain all of the advantages of the above-described heads and adds thereto the ability to far more quickly and easily uniformly wind lengths of cutting line onto the spool without materially increasing the cost of production.

SUMMARY OF THE INVENTION

Briefly, the present invention comprises an improved bump-feed-type rotary trimmer head including a housing defining a depending axially disposed tubular extension adapted to receive the drive bolt therein and shaped so as to define a first interference fit with the drive bolt and a second interference fit with a cam member such that rotation of the drive bolt effects corresponding rotation of the housing and cam member. The cam member defines a pair of vertically adjacent cams, preferably square in cross-section with each cam defining four perpendicularly disposed cam surfaces, the upper of said cams being rotationally offset 45° with respect to the lower of the two cams. A generally cylindrical cam follower defining two pair of diametrically opposed and inwardly facing abutment members arrayed about the central axis of the housing channel is disposed about the cam member. The abutment members are spaced 90° apart in a common horizontal plane and are carried by a cylindrical wall of the cam follower that extends about the cam follower. Each of the abutment members defines angularly disposed leading and trailing surfaces, the trailing surfaces defining cam abutment surfaces. A coil spring urges the cam follower downwardly against the cam member and a slidably disposed fastener engages the extended lower end of the drive bolt adjacent the lower end of the cam member such that the cam member is vertically moveable against the force of the coil spring relative to the cam follower between a first drive position in which the leading cam surfaces on the lower cam are in planar alignment with the trailing cam abutment surfaces on the cam follower and a second drive position in which the leading cam surfaces on the upper cam are in planar alignment with the trailing cam abutment surfaces of the cam follower.

In operation, the drive motor on the trimmer rotates the trimmer housing and cam member in a first direction that is imparted to the cam follower as a result of the abutment of the cam surfaces on the lower cam with the trailing cam abutment surfaces on the cam follower. Corresponding rotation of the spool is effected by the projection of the engagement lugs on the cam follower in the slots in the inner spool wall. Upon the cutting head being bumped upon the ground, a 45° rotation of the cam relative to the cam follower is effected and a subsequent 45° rotation occurs upon the head being released from the ground so as to effect a relative rotation of 90° between the spool and the housing and the paying out of predetermined lengths of fresh cutting line with each bump of the head upon the ground, regardless of the duration of the bump.

To facilitate loading the head with cutting line, the spool is provided with line receptor channels, that are preferably tapered and polygonal in cross-section, that project into an upper spool flange in a generally radial direction and are adapted to be radially aligned with the outlet eyelets in the housing wall by rotating the spool relative to the housing. Upon inserting the end portion of a length of cutting line through each of the eyelets and pushing the line firmly into the aligned receptor channels, the line will be securely held in place by the channel walls when pulled at an acute angle back toward the spool. Thus, by holding the housing stationary and rotating the spool in the same direction as the spool rotates in the drive mode, the secured lengths of line will be wrapped about the rotating spool, obviating the need to separate the spool from the housing for line loading purposes.

To provide an even distribution of the lengths of cutting line about the spool and prevent tangling within the spool, the trailing surfaces on the lower cam that are adjacent and perpendicular to the cam surfaces thereon and the leading surfaces on the abutment members on the cam follower are oppositely inclined such that rotation of the spool in the drive direction while holding the housing stationary will cause the inclined leading surfaces on the abutment members on the cam follower to periodically abut and slide upwardly along and over the trailing surfaces on the lower cam, compressing the coil spring. Once the cam surfaces clear the cam abutment members, the coil spring will force the cam follower downwardly, realigning the cam abutment surfaces with the lower cam. As a result, continual manual rotation of the spool relative to the housing will wrap the lines about the spool while providing a vertical reciprocating or ratcheting effect of the spool with respect to the housing as the line is wrapped thereon so that the line is uniformly disposed about the spool. Printed indicia are preferably molded into the upper surface of the spool to allow the user to easily orient the spool relative to the housing such that the receptor channels are radially aligned with the exit apertures in the housing enabling the line to be readily inserted through the eyelets and into the receptor channels to load the line about the spool.

The line receptor channels and spool ratcheting mechanism of the present invention that facilitate line loading can also be utilized in other bump and feed head configurations and in manual heads. In each case, the line receptors are provided on the spool flange radially alignable with the outlet eyelets in the housing. In a bump-feed head such as that disclosed in U.S. Pat. No. 4,959,904 at least the trailing surfaces on the lower cam follower that is defined by lower outer radial surfaces of the spool is inclined such that rotation of the spool in the drive direction while maintaining the housing in a stationary disposition will cause the spool to periodically ratchet upwardly and downwardly within the housing as the line is drawn inwardly through the eyelets and wrapped about the spool to effect an even distribution of the lengths of line about the spool within the housing. The leading radial surfaces of the lower cam follower and the trailing surfaces of the cams formed by the upper and lower portions of the housing may also be inclined to provide a smoother ratcheting movement for the head during the winding of the line onto the spool.

In a manual feed head such as that disclosed in U.S. Pat. No. 4,145,809, a plurality of pins or drive lugs are disposed about and project upwardly from the upper surface of the spool and project into correspondingly sized and spaced apertures in the upper surface of the housing such that rotation of the housing will effect corresponding rotation of the spool. By providing radially alignable line receptors in the spool flange and ramping the interior upper surface of the housing between each of the apertures therein, the line ends can be inserted through eyelets into the receptor channels and gripped by the spool so that rotation of the spool relative to the housing as above described will cause the lugs on the spool to repeatedly travel downwardly along adjacent ramps and snap upwardly into the next aperture. Continued relative rotation will thus effect the desired reciprocating motion of the spool within the housing to evenly distribute the cutting line about the spool.

BRIEF DESCRIPTION OF THE DRAWINGS

FIG. 4A is a top view of the cam member of the present invention.

FIG. 4B is a side view of the cam member of the present invention.

FIG. 5A is a top view of the cam follower member of the present invention.

FIG. 5B is a side view of the cam follower member of the present invention.

FIG. 5C is a cross-sectional view taken along the line 5C-5C in FIG. 5A.

FIG. 6 is a top view showing the relative positioning of the cam member and cam follower in their normal operating position.

FIG. 6A is a cross-sectional view taken along the line 6A-6A in FIG. 6.

FIG. 7 is a top view showing the relative positioning of the cam member and cam follower in the line feeding position.

FIG. 8 is a top view showing the relative positioning of the cam member and cam follower in the line wrapping position.

FIG. 8A is a cross-sectional view taken along the line 8A-8A in FIG. 8.

FIG. 8B is a sectional view illustrating the movement of one of the cam abutment members on the cam follower upwardly along and over one of the trailing surfaces of the lower cam during the winding of line onto the spool.

FIG. 9 is a sectional view of the embodiment of the trimmer head of the present invention illustrated in FIGS. 1-8B.

FIG. 10 is a perspective view of the spool used in the embodiment of the trimmer head of the present invention illustrated in FIGS. 1-9 with a portion of the spool broken away to illustrate the configuration of one of the line receptor channels therein.

FIG. 11A is an enlarged cross-sectional view taken along the line 11A in FIG. 10.

FIG. 11B is an enlarged partial side view showing the guide surface adjacent the outlet ends of the line receptor channels.

FIG. 12 is a sectional exploded view showing a modification of the housing portion of a trimmer head of the present invention and the drive bolt used with the modified housing.

DETAILED DESCRIPTION OF THE PREFERRED EMBODIMENTS

Figure 1:
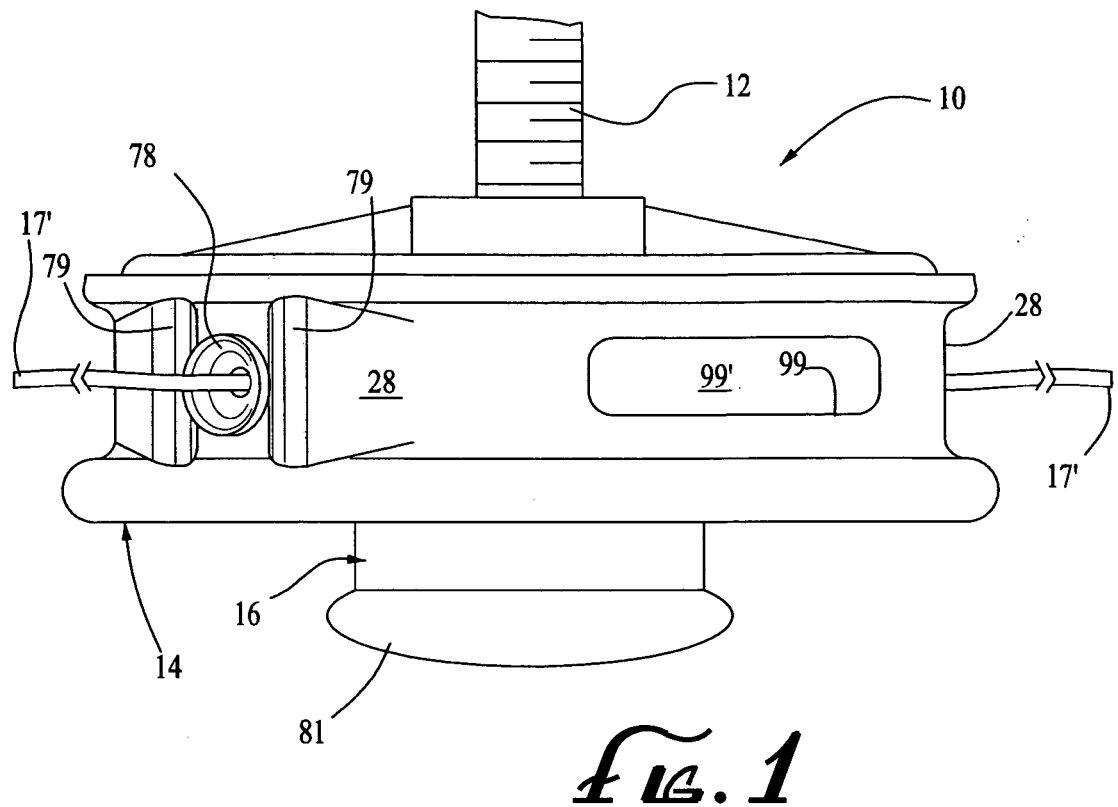
FIG. 1 is a perspective view of a first embodiment of the trimmer head of the present invention shown secured to the drive bolt of a rotary trimmer.
Figure 3:
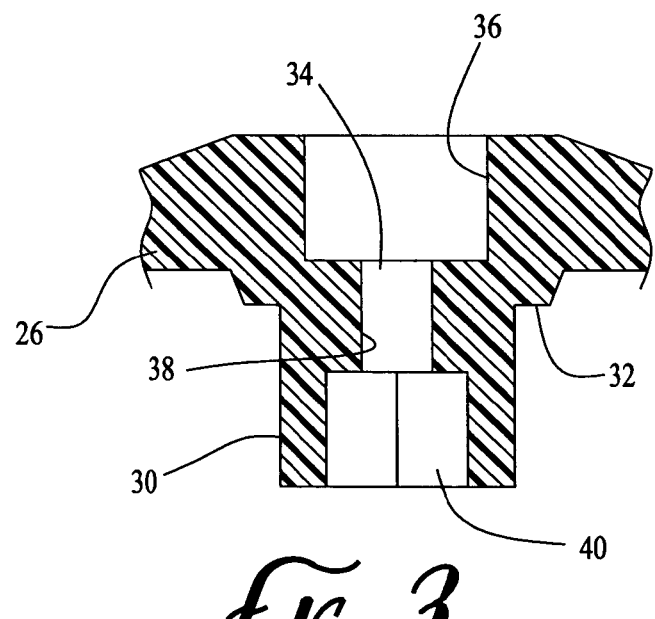
FIG. 3 is a cross-sectional view of the trimmer head housing of the present invention taken along line 3-3 in FIG. 2.

Referring now in detail to the drawings, a first embodiment of a bump-feed type trimmer head 10 of the present invention is shown in FIG. 1 mounted on the extended end of a rotatable drive shaft 12 on a gasoline or electric powered rotary trimmer (not shown). The trimmer head 10 generally comprises a housing 14, a spool 16 for carrying one or more lengths of coiled monofilament nylon cutting line 17, a cam member 18, a cam follower 20, a coil spring 22, a drive bolt 24 and a retaining nut 25. The trimmer housing 14 is preferably formed by injection molding a nylon 6 copolymer and defines a circular upper wall 26, a cylindrical depending skirt 28 and a centrally disposed tubular extension 30 depending from upper housing surface 26 into the interior of the housing about the central axis of rotation "Y" of the head. The tubular extension 30 in the trimmer head housing 14 defines an annular outer shoulder 32 for coil spring 22 and an axial channel 34 through which the drive bolt 24 extends. Channel 34 is configured to create a mating fitment with both the drive bolt 24 and cam member 18. The upper end portion 36 of channel 34 is preferably square in cross-section; the central portion 38 is of a constant radius and the lower portion 40 is hexagonal in cross-section.

Figure 2:
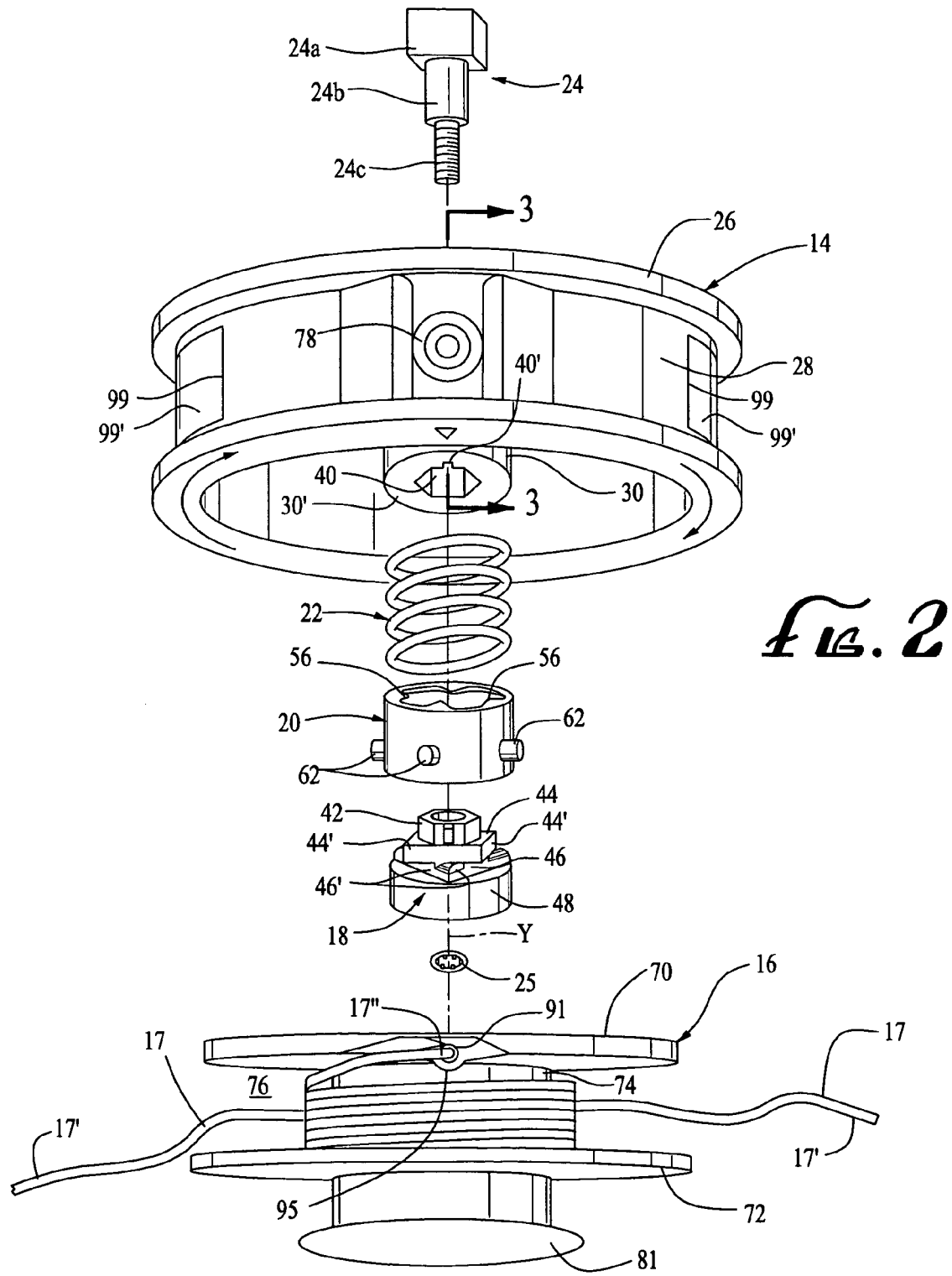
FIG. 2 is an exploded perspective view of the various elements comprising the embodiment of the trimmer head of the present invention illustrated in FIG. 1.

As seen in FIGS. 2 and 9, the drive bolt 24 defines a square head portion 24a which is received within the correspondingly configured upper portion 36 of channel 34, a cylindrical body portion 24b that extends through the central cylindrical portion 38 of channel 34, and a lower shaft portion 24c that projects from the larger diameter body portion 24b and extends through and projects from the lower hexagonal portion 40 of channel 34. The drive bolt also defines an internally threaded cylindrical bore 24d extending axially through the head portion 24a and a substantial part of central portion 24b for threaded engagement with the drive shaft 12 of the trimmer. Thus, with the drive bolt 24 disposed in channel 34 and in threaded engagement with the drive shaft 12, rotation of the drive shaft imparts corresponding rotation to the drive bolt 24 and housing 14 due to the interference fit between the square head portion 24a of the drive bolt and the upper portion 36 of channel 34 defined by housing extension 30.

It should be noted that the head portion of the drive bolt and the cross-section of the upper portion of the axially depending tubular member could be formed of shapes other than square to form the desired interference fit. For example, they could both be hexagonally shaped and rotation of the drive bolt would still be imparted to the trimmer head.

The cam member 18 is preferably molded of nylon 6 glass reinforced material, is of single-piece construction and, in the preferred embodiment, defines a hexagonally-shaped head portion 42, an upper cam 44, a lower cam 46 and a lower skirt portion 48. Head portion 42 is sized and shaped so as to be received within the lower portion 40 of channel 34 in extension 30 such that rotation of the housing 14 in a counterclockwise direction (as seen from above and indicated by arrow D in FIGS. 6 and 7) will impart corresponding rotation to the cam member 18. In the preferred embodiment, the head portion 42 of the cam member 18 and the cross-section of the lower portion 40 of channel 34 are hexagonal. It is to be understood, however, that other non-circular shapes (e.g. square) could be used to provide the desired interference fit between the tubular extension 30 in the housing and the cam member.

Figure 17:
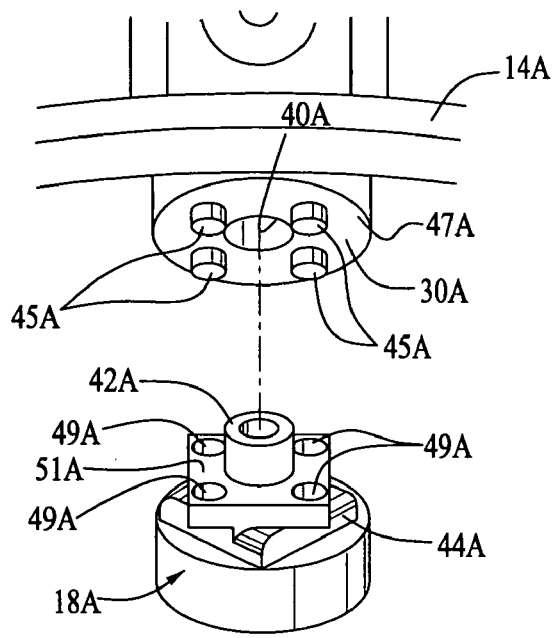
FIG. 17 is an enlarged exploded view of portions of an alternate embodiment of housing and cam member employable in the present invention.
Figure 18:
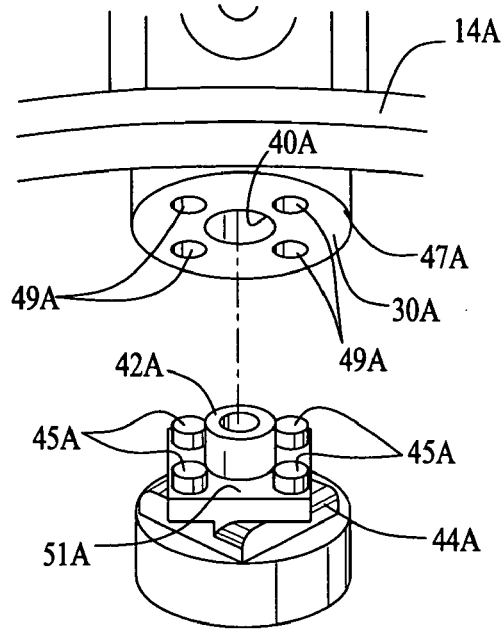
FIG. 18 is an enlarged exploded view of another alternate embodiment of the housing and drive cam of the present invention similar to that shown in FIG. 17 but with the elements creating the interference fit between the housing and the cam member being reversed.
Figure 19:
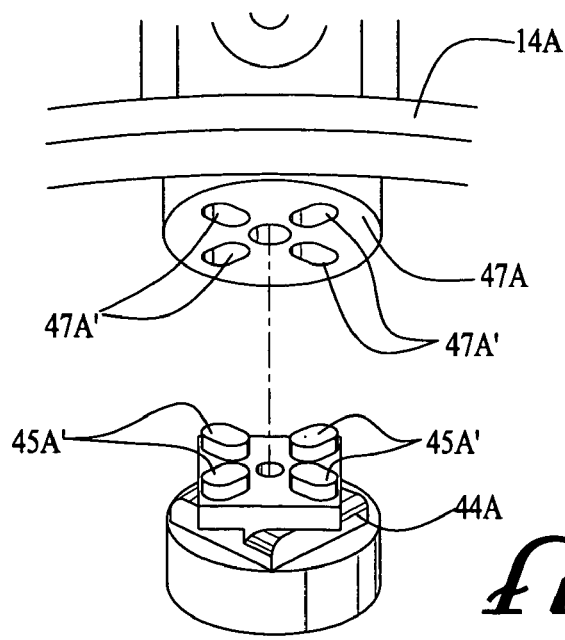
FIG. 19 is an enlarged partial exploded view of yet another alternate embodiment of the housing and drive cam employable in the present invention.
Figure 20:
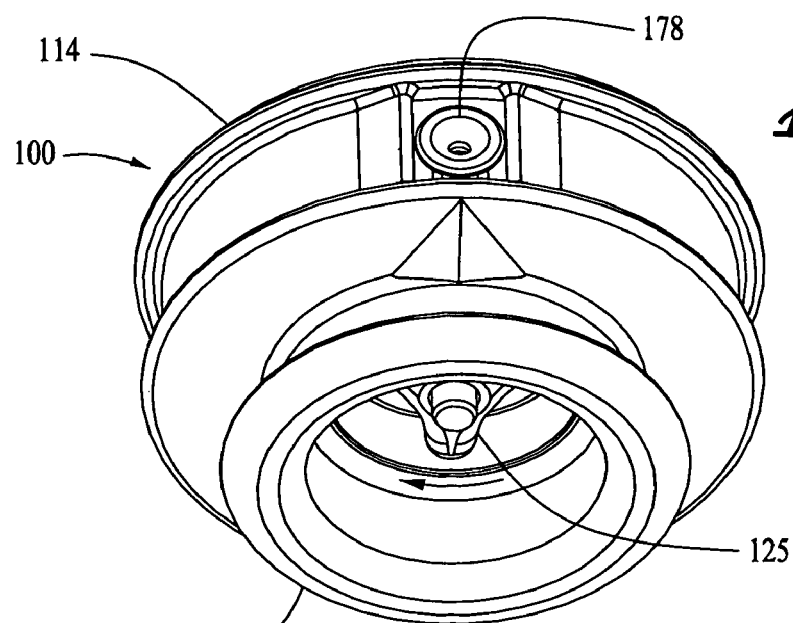
FIG. 20 is a perspective view of a second embodiment of the trimmer head of the present invention as seen from below.
Figure 21:
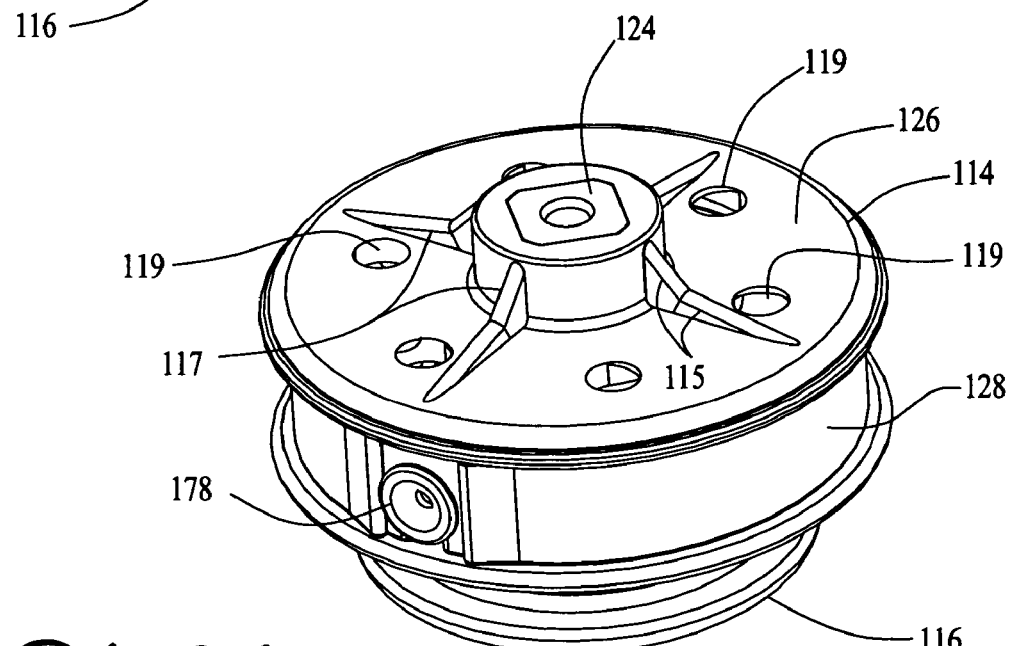
FIG. 21 is a perspective view of a second embodiment of the trimmer head of the present invention as seen from above.
Figure 22:
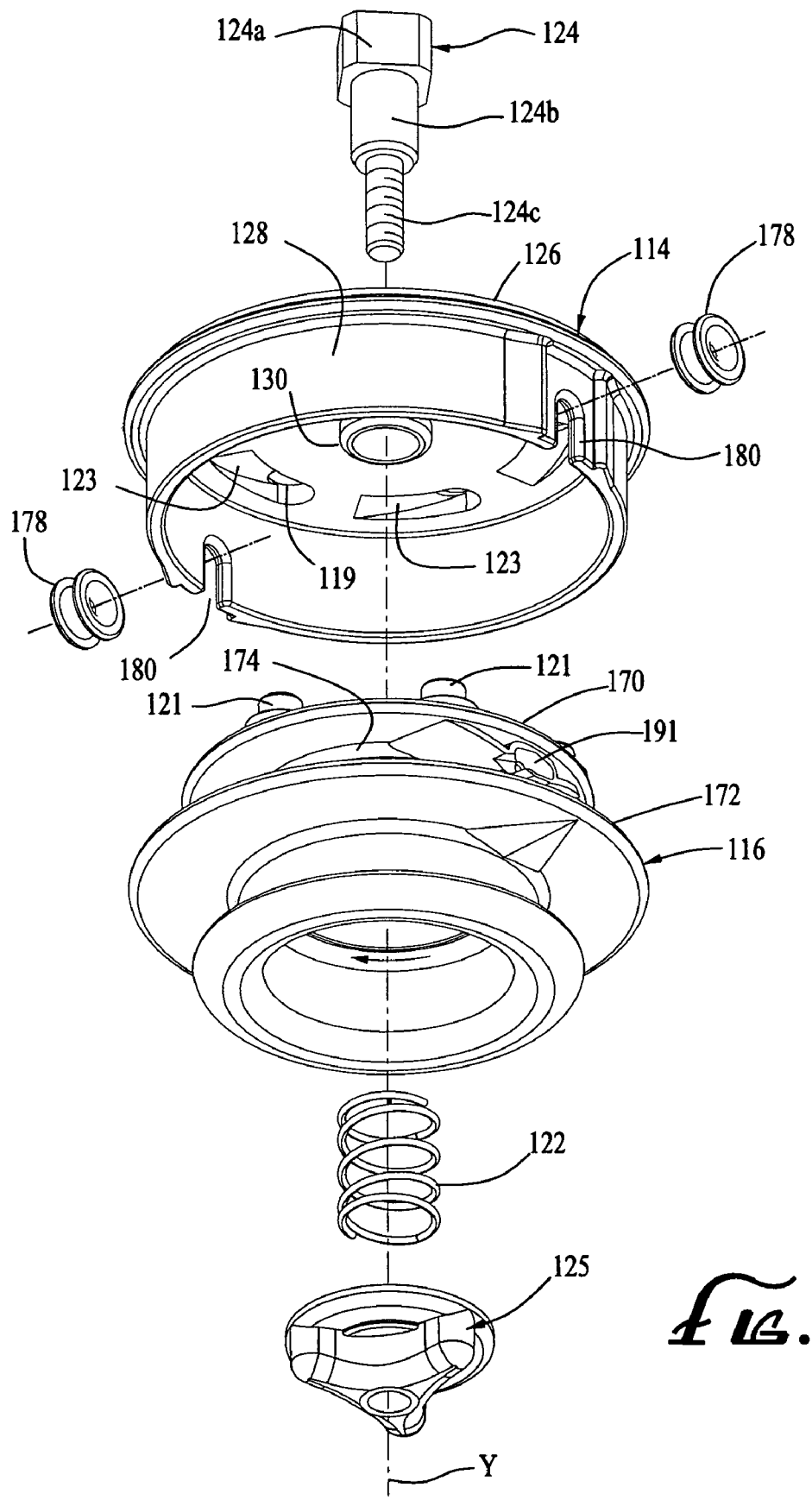
FIG. 22 is an exploded perspective view of the various elements comprising the second embodiment of the trimmer head of the present invention illustrated in FIGS. 20 and 21.
Figure 23:
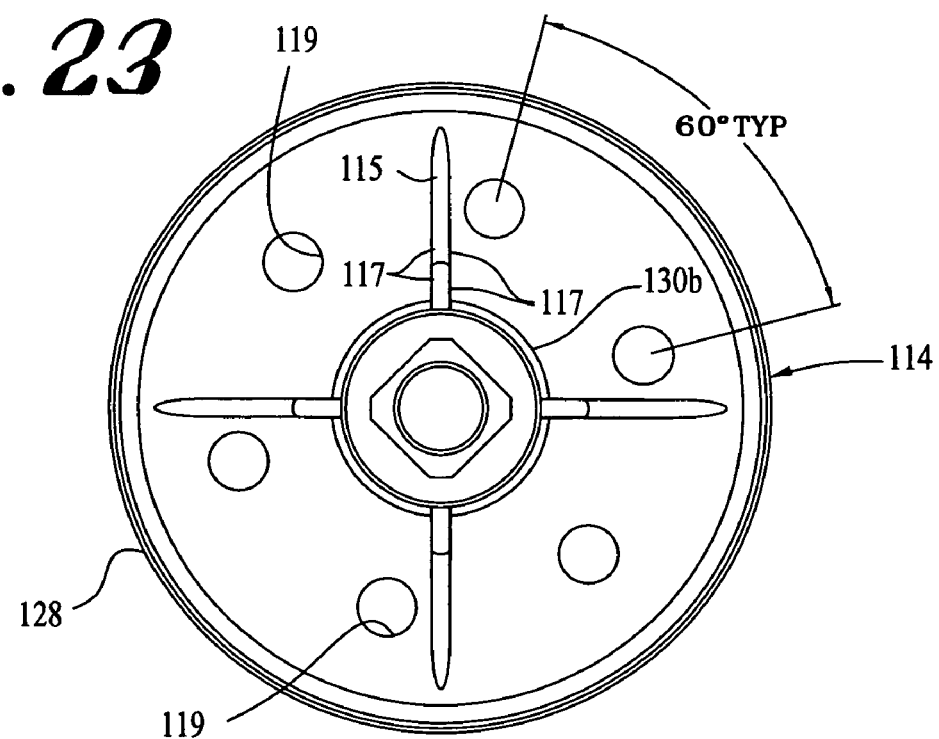
FIG. 23 is a top plan view of the trimmer head housing of the second embodiment of the present invention.
Figure 24:
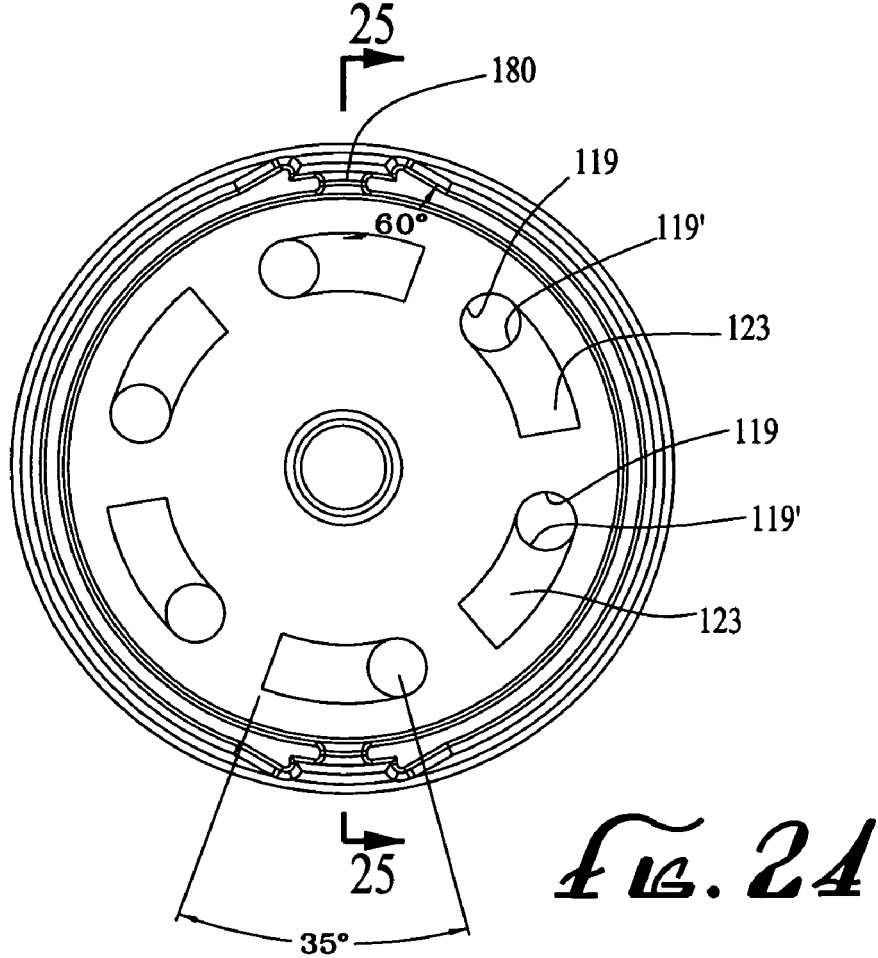
FIG. 24 is bottom plan view of the trimmer head housing of the second embodiment of the present invention.
Figure 25:
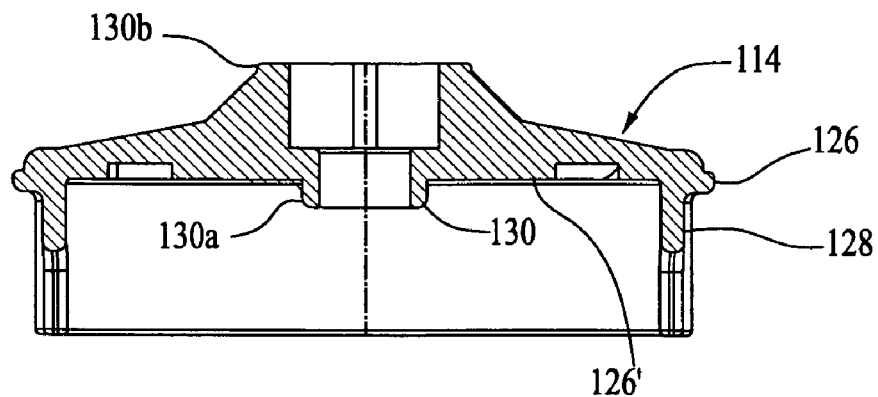
FIG. 25 is a cross-sectional view taken along the line 25-25 in FIG. 24.

In alternative embodiments of the housing and cam member, the head portion 42A of cam member 18A and the cross-section of the lower portion 40A of the tubular extension 30A in the housing 14A is cylindrical and the interference fit between the housing and the cam member is provided by means of a plurality of ribs or lugs 45A projecting vertically from the extended end 47A of the tubular extension 30A and a corresponding plurality of receiving slots or apertures 49A formed in upper surface 51A of cam 44A as seen in FIG. 17. While at least one complimentary pair of ribs and slots or lugs and apertures would be required to prevent relative rotational movement between the housing and cam member, a greater number is preferable and, from a manufacturing and operational standpoint, four equally spaced pairs of ribs and slots or lugs and apertures would appear to be ideal. Such a configuration is illustrated in FIG. 17. It is to be understood that the male element of such an interference fit (e.g., rib or lug) could be provided on either the extended end 47A of the tubular housing extension 30A as shown in FIG. 17 or on the upper surface 51A of the cam 44A. In either case, and the corresponding female elements (e.g., slot or aperture) would be provided in the other component. Such a reversal of parts is shown in FIG. 18. In yet another alternative embodiment, the head portion of the cam member could be eliminated altogether and the required interference fit provided by the same or similar plurality of ribs or lugs 45A' and receiving slots or apertures 47A'. Such a variation is illustrated in FIG. 19. Again, the corresponding male and female elements could be reversed.

The upper and lower cams 44 and 46 are preferably each of a square configuration so as to define four identical perpendicularly disposed surfaces, 44' and 46' on each cam. That portion of each of those surfaces that is adjacent a corner of one of the cams 44 or 46 on the drive or leading side of the cam, as the cam rotates in a counterclockwise direction D (as seen from above), defines a cam surface 44a or 46a. Each cam surface on each cam is parallel to the axis of rotation Y of the head. The upper cam 44 is rotationally offset 45° from the lower cam 46 as seen, for example, in FIG. 4A. Those portions of lower cam surfaces 46' that are perpendicular to and adjacent cam surfaces 46a (and thus on the trailing sides of the cam 46 as the cam member 18 rotates counterclockwise) are inclined upwardly as seen, for example, in FIGS. 2 and 4B and define slide surfaces 46b. Slide surfaces 46b can be formed by an inclined linear surface or a curvilinear surface. In the embodiment of the invention illustrated in FIGS. 1-9, the slide surfaces are preferably radiused. By way of example, in a cam member 18 in which the upper and lower cams 44 and 46 each define surfaces 44' and 46' of about 0.90 in. in length and the lower cam 46 has a thickness of about 0.20 in. The inclinations on trailing slide surfaces 46b define a circular segment having a radius of 0.125 in. Alternatively, surfaces 46b could be upwardly inclined at an angle of about 25 degrees.

Cam member 18 further defines an axially disposed channel 50 extending vertically therethrough. Channel 50 has a first upper constant radius portion 50a adapted to receive the first constant radius portion 24b of drive bolt 24 and a second smaller diameter constant radius portion 50b adapted to receive in a slip fit the second and smaller constant radius portion 24c of drive bolt 24, which extends therethrough.

The cam member 18 is disposed within trimmer head 10 interiorly of the cam follower 20, the configuration which is best seen in FIGS. 5A and 5B. To properly align the cam member 18 with respect to the line outlet eyelets 78 in the trimmer head housing, a key 42' is molded into the side of the head portion 42 of the cam member which is received in a slot 40' in lower portion 40 of the central housing channel 34.

The cam follower 20 is preferably molded of the same material as cam member 18, is of single-piece construction and defines a cylindrical wall portion 52 circumscribing a chamber 54 and four equiangularly disposed projections defining abutment members 56 extending radially inwardly of chamber 54 from the upper interior end portions of cylindrical wall 52. Each of the abutment members 56 defines an angularly disposed cam abutment surface 56a and an inclined slide surface, 56b. Relief areas 60 are disposed between members 56. The abutment surfaces 56a are on the trailing side of each abutment member, extend parallel to the axis of rotation Y of the cutting head and are angled at 135° with respect to an adjacent slide surface 56b. A plurality of outwardly projecting radial lugs 62 (four being shown) are equiangularly disposed about the cylindrical wall portion 52 of the cam follower 20 for the releasable securement of the spool 16 to the cam follower.

The spool 16 defines an upper annular flange 70 and a lower annular flange 72 carried by a hollow cylindrical body portion 74 so as to define an annular area 76 between flanges 72 and 74 for carrying coils of flexible nylon cutting line 17 wrapped about body portion 74 such that upon assembly, the end portions 17' of the cutting line extend outwardly through eyelets 78 which are press fit through opposed apertures 80 in the sidewall of the head formed by housing skirt 28. In the preferred head configuration shown in FIG. 1, the portions of the housing skirt 28 adjacent the eyelets 78 are raised or ramped radially outwardly to protect the eyelets during use from foreign objects.

The body portion 74 of spool 16 further defines a rounded bumper 81 at its lower end, an interior cylindrical chamber 82, a pair of diametrically opposed and identically configured vertical locking channels 84 in the interior side wall thereof and a pair of diametrically opposed and identically configured vertical guide channels 88 transversely aligned with respect to locking channels 84. As seen in FIG. 10, locking channels 84 terminate at their lower ends in somewhat shallower offset portions 90 that terminate in a pair of opposed securement apertures 92 extending through the cylindrical body portion 74. The locking and guide channels are each adapted to slidably receive one of the outward projecting radial lugs 62 on the cam follower 20. The guide channels 88 differ from locking channels 84 in that they are wider, of a constant length and do not terminate in apertures. The guide channels preferably have a width equal to the width of the locking channels plus the length of the offset portions 90 of the locking channels 84.

The spool 16 is secured to the cam follower 20 upon aligning the lugs 62 with the locking and guide channels 84 and 88 such that the end portions 17' of the cutting line 17 project radially from the spool 16 proximate eyelets 78, the spool is pressed over the cam follower until the lugs 62 reach the lower ends of the guide and locking channels. The spool is then rotated such that the lugs in the two locking channels 84 pass into the slightly shallower offset portions 90 thereof, slightly compressing the cam follower until the two lugs reach the apertures 92 whereupon the resiliency in the cam follower material causes the lugs to snap into apertures 92, securing the spool to the cam follower. In the locked position, the two lugs in apertures 92 are disposed adjacent the aperture walls and the two lugs in the guide channels 88 are adjacent the leading walls of the channels such that during use, all four lugs will abut their adjacent walls to effect corresponding rotation of the spool 16 with the cam follower 20. To remove the spool, one need only twist the spool relative to the cam follower and when the lugs are pulled back into the vertical portion of the locking channels, the spool can be easily axially withdrawn from the housing.

The above-described lug and channel configuration allows the spool 16 to be used with cam followers having either four equally-spaced drive lugs 62 (as shown) or two opposed lugs if desired. In addition, the driving force is evenly distributed among the four lugs 62 on the cam follower 20. Guide channels 88 are provided in lieu of a second pair of locking channels 84 for mold forming purposes only. Otherwise, four identical locking channels could be employed. If desired, the two guide channels in the spool could be widened so as to each define an arcuate length of about 95° such that the spool could accommodate cam follower configurations having six equally-spaced projecting lugs. Again, the guide channels would be sized such that two of the lugs in each of the guide channels would be adjacent a leading wall of the channel such that during use, four lugs will again function as drive lugs to effect rotation of the spool.

To provide rapid loading of the trimmer line about spool 16, the upper spool flange 70 is provided with a pair of opposed line receptors 91 for gripping inner end portions 17" of two separate lengths of cutting line 17. Each of the receptors 91 comprises a line receptor channel 93 that extends radially inwardly from an enlarged outer flared portion 93' adjacent the outer edge of the spool to the spool's cylindrical body portion 74. The receptor channels 93 are configured and oriented so as to tightly grip the cutting line 17 when an end portion of the line is inserted therein, through the aligned eyelet, and pulled at an acute angle back toward the spool, as will be described. Examples of channels 93 are shown in detail in FIGS. 11A-G, 11J, 11L, 14A and B. A preferred channel configuration is polygonal in cross section, most preferably hexagonally shaped, and tapers inwardly from the enlarged flared portion 93' to body portion 74 at an angle of about 5°. The size of the receptor channels depends on the size of the line to be secured therein. By tapering the channel walls inwardly at an angle of about 5°, the channels can accommodate variations in line size.

Figure 14A:
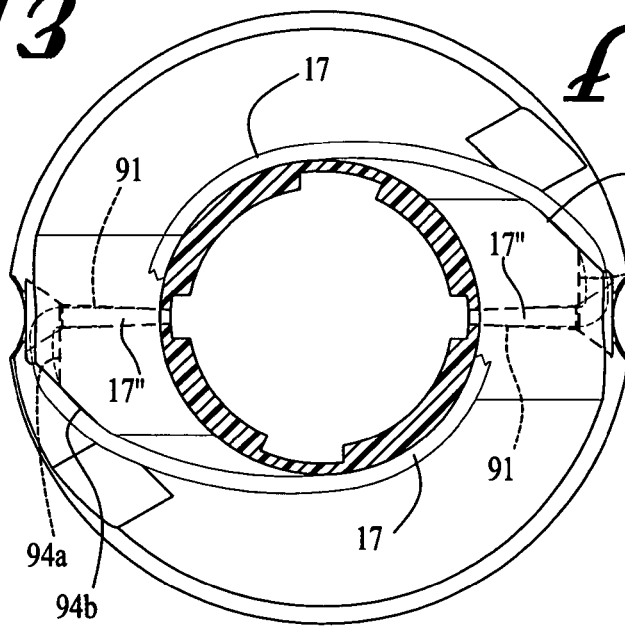
FIG. 14A is a sectional view of the spool showing the inner end portion of a length of cutting line being held within one of the line receptors and being wound about the spool.
Figure 14B:
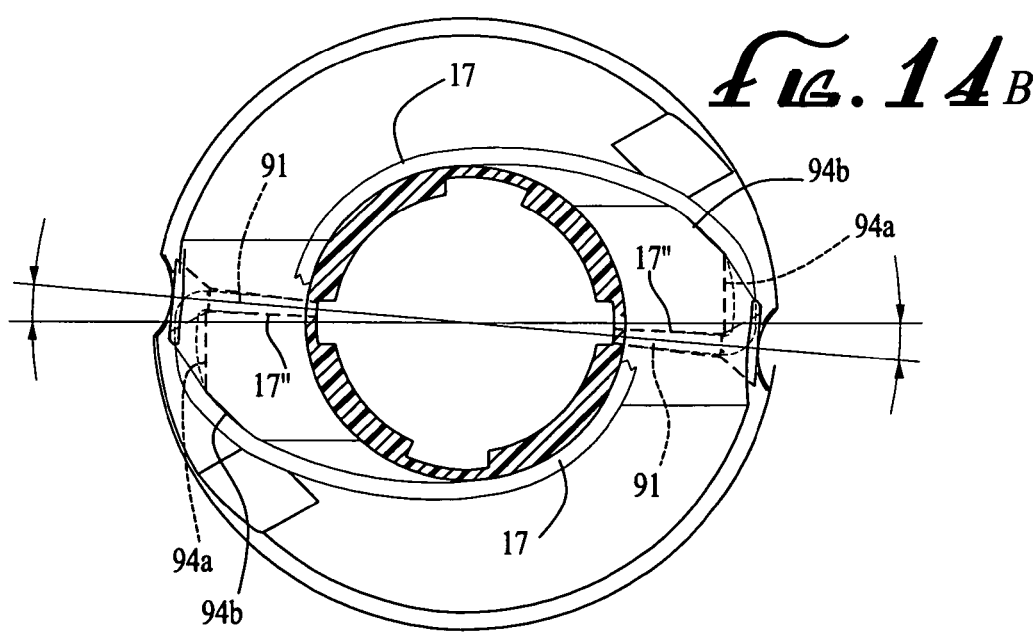
FIG. 14B is a sectional view of the spool having an inwardly inclined line receptor channel and showing the inner end portion of a length of cutting line being held within one of the line receptors and being wound about the spool.

By way of example, a tapered channel 93, hexagonal in cross-section and having a length (exclusive of flared portion 93') of about 0.650 in., a transverse dimension measured across the two parallel sides adjacent the enlarged flared outlet end of about 0.130 in. and a transverse dimension across the inner channel end of about 0.075 in. (see, e.g., FIG. 11A), has been successfully employed in trimmer head 10. Conventional nylon cutting line having diameters of 0.080 in., 0.095 in. and 0.105 in. can be received therein and tightly gripped by the receptor channel walls as the line is pulled from the outer end of the channel and wrapped about the spool as shown in FIGS. 14A and 14B.

To properly direct the line inwardly upon exiting the receptor channel, the downstream or left side of the enlarged flared portion 93' of each receptor 91 is cut away so as to define flat guide wall surfaces 94a and 94b as shown in FIGS. 11B and 13-15. Surface 94a is substantially perpendicular to the central axis of the receptor channel and inclined slightly downwardly such that the central longitudinal axis "X" of the guide wall surface defines an angle declination of about 5°-10°, depending on the configuration of the spool, with respect to the horizontal. Adjacent surface 94b is inclined inwardly to direct the line toward the center of the spool. Thus, when the cutting line is inserted into one of the receptor channels 93 and pulled laterally against guide surface 94a and inwardly against guide surface 94b, the line effectively forms an acute angle with the central channel axis. In addition, the lower inner surface 95 of the flange extending under channel 93 is rounded so as to avoid any abrupt surface deviations on the spool adjacent the line receptors 91 which could interfere with the proper winding of the line and to direct the line downwardly toward the lower flange 72. The channel 93 is preferably oriented about its central axis such that opposed corners of the channel align with the central axis X of guide wall surface 94a as shown in FIG. 11C.

By aligning opposed channel corners with the central axis "X" of guide wall surface 94a, the cutting line is pinched by the converging channel walls as the line is pulled from the channel and along the adjacent guide wall surface 94a. Due to the inherent stiffness in the nylon cutting line, this pinching of the cutting line occurs not only at the channel wall corner 93" adjacent guide surface 94a (see FIG. 11C), but also at the opposed corner at the inner end of the line receptor channel, enhancing the gripping of the line. While a line receptor channel having a hexagonally configured cross-section that is not aligned with the central axis of surface 94a as above described (see, e.g., FIG. 11B), will still grip the line, the alignment illustrated in FIG. 11C takes better advantage of the pinching effect created by the hexagonal cross-sectional configuration of the channel and is thus preferred. Further, by inwardly inclining the central axis of the receptor channel 93 at about 5° toward guide wall 94a, as seen in FIG. 14B, as opposed to radially aligning the central axis of the channel with the center of the spool as seen in FIG. 14A, the central channel axis forms an acute angle with respect to a line tangent to the flange at the outlet end of the channel. As a result, cutting line is caused immediately to form an acute angle with respect to the central channel axis as it exits the receptor channel and is pulled against the adjacent guide wall surface 94b. This further increases the pinching effect of the channel wall on the line, further enhancing the gripping of the cutting line. The more securely the receptor channel grips the line, the easier it is for the user to effect the initial winding of the line about the spool without the line being inadvertently pulled from the receptor channel. However, the acute angle formed adjacent to the outlet ends of the receptor channels by inclining the central axis of the channels inwardly as described, may be too tight for 0.105 in. diameter line. Accordingly, in trimmer head designed to accommodate such larger line, a radially directed channel may be preferred.

Figure 11C:
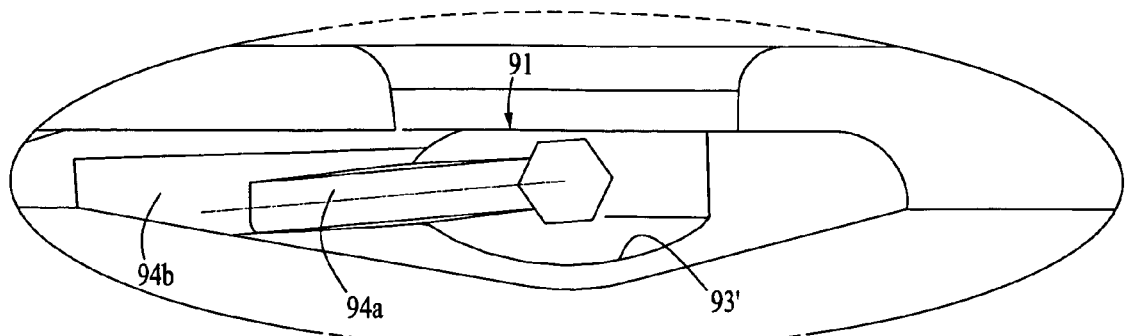
FIG. 11C is a further enlarged partial side view showing the line receptor channel configuration illustrated in FIG. 11B in a preferred angular orientation relative to the line guide wall surface adjacent the outlet end of the receptor channel.
Figure 11D:
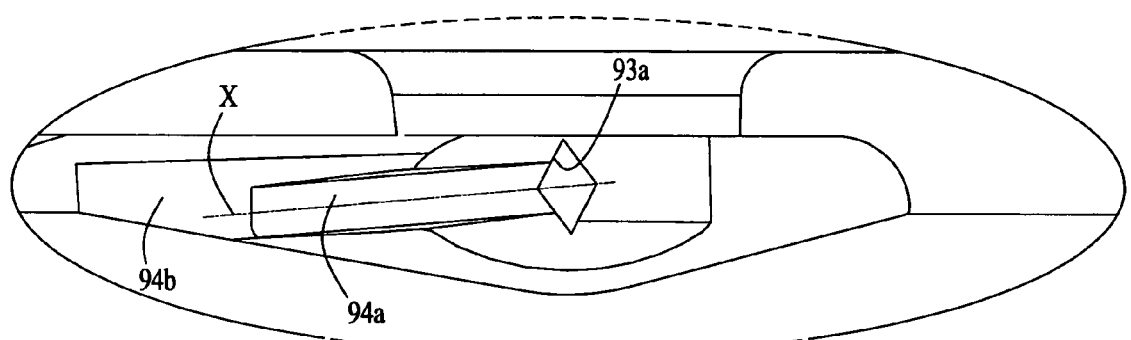
FIG. 11D is an enlarged partial side view showing the preferred angular orientation of a line receptor channel having a diamond-shaped cross-sectional configuration relative to the guide wall surface adjacent the outlet end of the receptor channel.
Figure 11E:
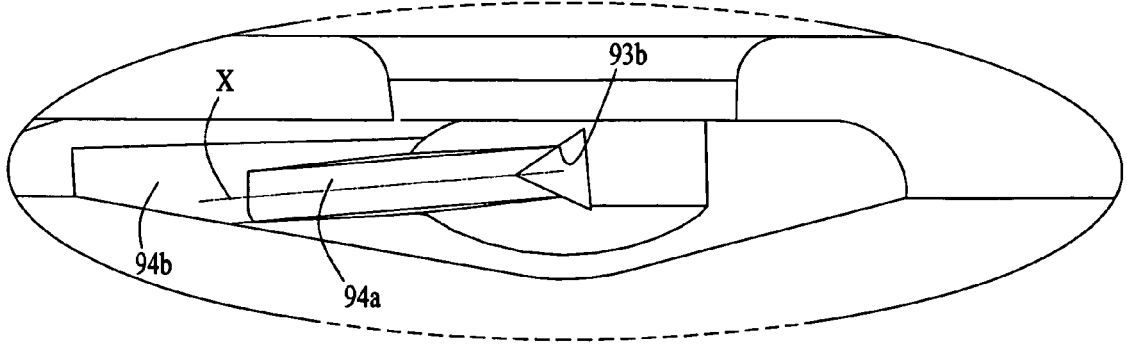
FIG. 11E is an enlarged partial side view showing the preferred angular orientation of a line receptor channel having a triangularly-shaped cross-sectional configuration relative to the guide wall surface adjacent the outlet end of the receptor channel.
Figure 11F:
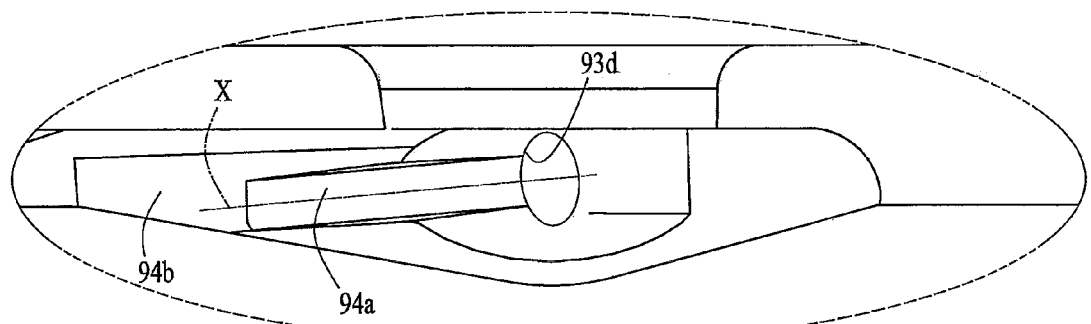
FIG. 11F is an enlarged partial side view showing the preferred angular orientation of a line receptor channel having a oval-shaped channel wall configuration relative to the guide wall surface adjacent the outlet end of the receptor channel.
Figure 11G:
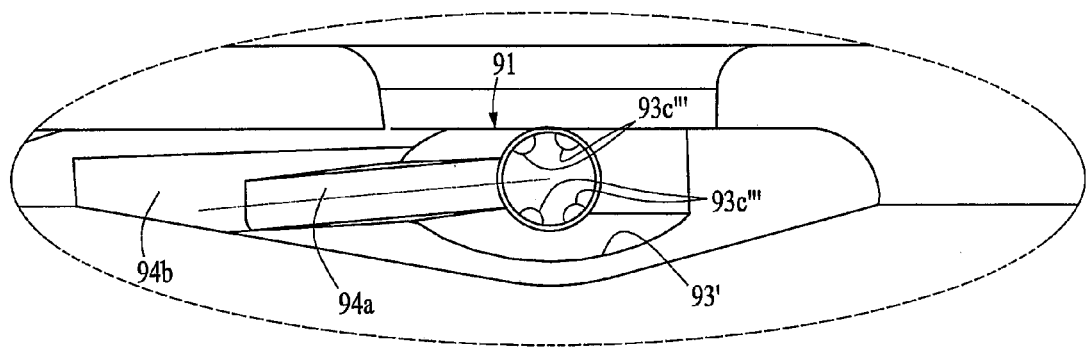
FIG. 11G is an enlarged partial side view showing the desired orientation of a ribbed channel wall configuration relative to the guide surfaces adjacent the outlet end of the line receptor channel.

Additional line receptor channel configurations are illustrated in FIGS. 11D-G. FIGS. 11D and E illustrate other polygonal configurations particularly suited for use with the present invention. FIG. 11D illustrates a line receptor channel 93a having a diamond-shaped cross-section. To maximize the line pinching effect of such a channel, the channel should be oriented such that the opposed corners lying on the minor axis of the cross-section lie on the longitudinal axis "X" of the guide wall surface as shown in the drawing. FIG. 11E illustrates a line receptor channel 93b having a triangularly-shaped cross-section. To maximize the line pinching effect of such a channel configuration, one of the apexes of the triangle defined by the channel at the outlet end thereof is positioned on the longitudinal axis of the guide wall surface adjacent the guide wall surface as shown in FIG. 11E. Other polygonal cross-sectional configurations could also be employed in the formation of the line receptor channels 93 of the present invention. However, it is believed that a channel formed by more than about eight side walls would be sufficiently round so as to not provide the desired gripping force on the line. Round radial channels have been found not to provide adequate grip on the line as have channels defining a square cross-sectional configuration when the flat sides of the square lie on the longitudinal axis of the guide wall surface. Other channel configurations could also be employed. For example, as illustrated in FIG. 11F, a line receptor channel 93c having an oval-configuration wherein the minor axis of the oval lies on the longitudinal axis of the guide wall channel surface should provide adequate gripping force for the line. Irregularities in channel wall surfaces could also be employed. For example, FIG. 11G illustrates a line receptor channel configuration in which a plurality, preferably four, longitudinally extending ribs 93''' are provided in an otherwise round channel wall to grip the line. To prevent excessive wear on the ribs and/or line, the ribs are preferably spaced such that the line would bear equally against two of the ribs both at the inner and outer ends of the channel as seen in FIG. 11G. Other such irregularities in the side wall(s) of the receptor channel could include roughened surfaces and helically extending ridges on channels (not shown).

While the above discussed line receptor channel configurations have been described and illustrated as extending the full length of the channel, and indeed such configurations are preferred, it should be noted that the gripping characteristics of the channel, need not extend the length of the channel. Acceptable gripping of the line may be obtained by providing the line gripping cross-sectional configuration only at the outer end portions of the channels. By way of example, the outer end portion of the channel could be hexagonally or diamond-shaped in cross-section, while the remainder of the channel could be round. As the line is pulled laterally from the channel and against the adjacent guide surface 94a and then inwardly against surface 94b, the line would be retained in the receptor channel by the converging walls in the outer end portion of the channel. The outer portion of the channel in such configurations should be at least about 0.150 in. in length. Similarly, when utilizing a tapered line receptor channel to accommodate multiple line sizes, only the inner portion of the line, needs to be tapered. Preferably, at least about fifty percent of the axial length of the channel (exclusive of flared portion 93') should be tapered in such channel configurations.

Figure 11H:
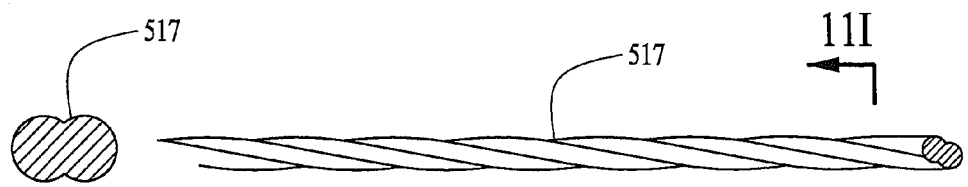
FIG. 11H is a perspective view of a portion of a length of particularly configured cutting line employable in the trimmer head of the present invention.
Figure 11I:
FIG. 11I is a sectional view taken along the line 11I-11I of FIG. 11H.
Figure 11J:
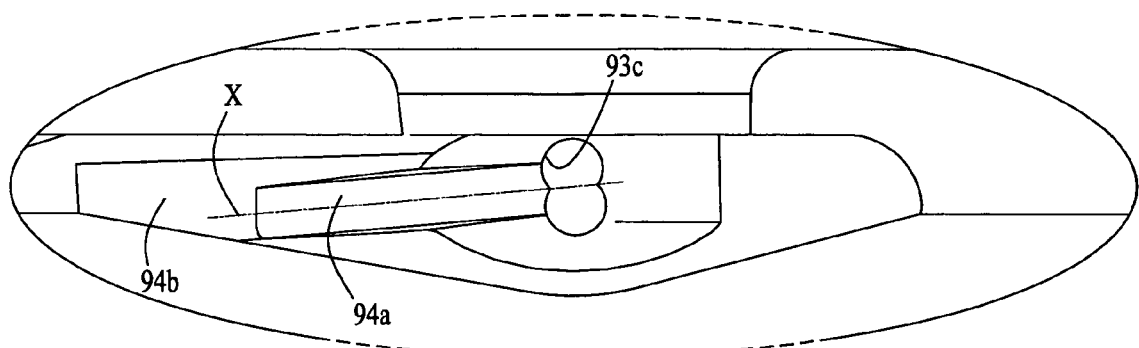
FIG. 11J is an enlarged partial side view showing the outlet end of a line receptor channel and adjacent guide surface adapted for use with the cutting line illustrated in FIGS. 11H and 11I.

In addition to retaining the end portions of the cutting line by configuring the cross-sections of at least the outer portions of the line receptor channels so as to grip the line as above-described, the channels could be configured to cooperate with a particular line configuration to effect securement of the line by a mating or keying effect as the line is wrapped about the spool. For example, a flexible noise attenuating trimmer line marketed by Proulx Manufacturing, Inc. of Rancho Cucamonga, Calif., under the name Ultra Quiet, is formed by extruding two non-filament polymer strands in close disposition and twisting the two strands together about a longitudinal axis in a cooling bath. Upon curing, the formed line defines two overlapping cylindrical strands joined together in two opposed substantially V-shaped troughs that extend helically along and about the line. Such a line configuration has been found to provide substantial noise attenuation as compared to comparably sized conventional line rotating at the same speed and is the subject of a pending U.S. patent application Ser. No. 09/942,248, filed Aug. 29, 2001. An example of such noise attenuating trimmer line 517 is illustrated herein in FIG. 11H and its cross-sectional configuration is illustrated in FIG. 11J. By configuring the line receptor channel 593 (see FIG. 11J) so as to have a corresponding cross-section helically extending along at least the outer portion of the channel, the channel wall will mate with the line as the line is inserted into the channel through the aligned line outlet opening in the housing skirt and rotated, effectively threadably engaging the line in the channel and securing the end portion of line to the spool.

Figure 11K:
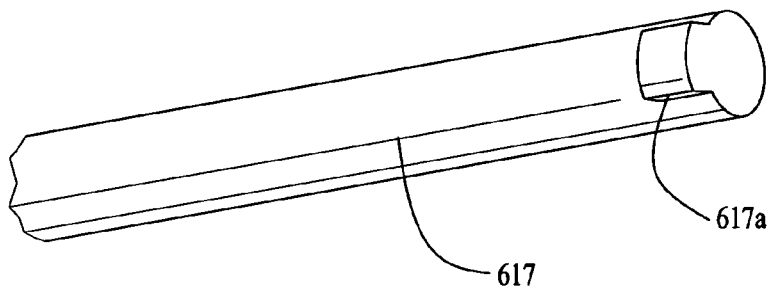
FIG. 11K is a perspective view of a portion of a length of another example of a particularly configured cutting line employable in the trimmer head of the present invention.
Figure 11L:
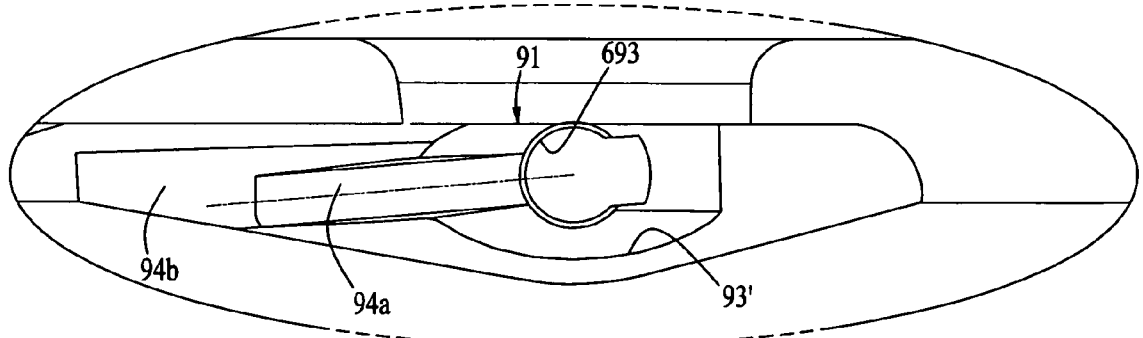
FIG. 11L is an enlarged partial side view showing the outlet end of a line receptor channel and adjacent guide surface adapted for use with the cutting line illustrated in FIG. 11K.

Another example of a keyed line and receptor channel is illustrated in FIGS. 11K and 11L. As seen therein, a length of the cutting line 617 is provided with protruding locking feature 617a proximate one end of the line. Feature 617a could be of any convenient configuration. At least the end portion of the line receptor channel 693 (see FIG. 11L) is correspondingly configured to receive the line with its protruding feature and an offset channel area is provided within the channel to allow the line to be rotated such that the protruding feature is received in the offset area. Thus, upon aligning the feature 617a with the outer end of the receptor channel 693, inserting and twisting the line, the length of line is secured to the spool by the trapped locking feature, whereupon the line can be wrapped about the spool body as previously described. In all such embodiments the circular holes in the eyelets 78 in the side of the trimmer housing are sufficiently larger than the diameter of the cutting line, that the locking feature will not interfere with the extension of the line through the eyelets.

Figure 14C:
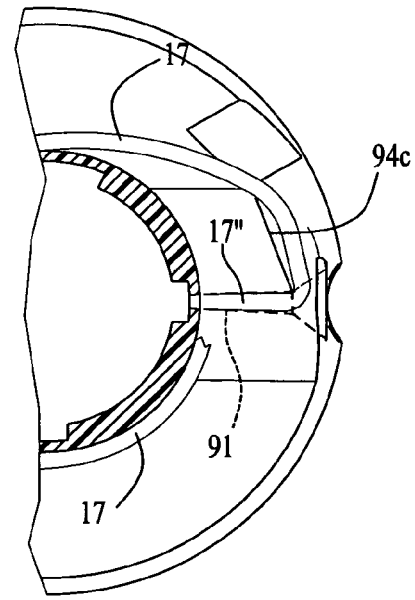
FIG. 14C is a partial sectional view of a spool having a single line guide wall surface and showing the inner end portion of a length of cutting line exiting the adjacent line receptor channel and being pulled against the guide wall surface.

FIG. 14C illustrates yet another modified line receptor which employs a single, inwardly inclined guide wall surface 94c disposed adjacent to the outlet end of the receptor channel. The single inwardly inclined surface 94c, like the inwardly inclined channel 93 illustrated in FIG. 14B, creates an acute angle between the central axis of the receptor channel and the guide surface adjacent to the channel outlet. This single guide surface 94a is preferred for use in smaller heads as it directs the line inwardly toward the center of the spool more quickly than the previously described guide surface comprised of laterally extending portion 94a and inclined portion 94b and the smaller diameter spools tend to reciprocate upwardly and downwardly more quickly than the larger spools. As the smaller spools are not generally designed to accommodate the larger diameter line, the acute bend created by the guide surface 94c is generally not an issue.

Figure 15:
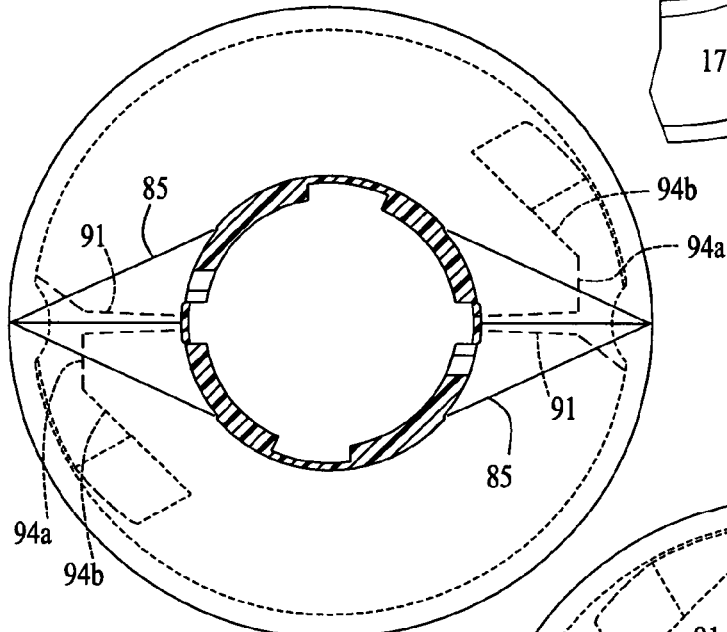
FIG. 15 is a bottom plan view of the spool showing the eyelet alignment indicia thereon.

With each of the above-discussed variations in the line receptors, the line winding process is essentially the same. To wind the cutting line on the spool 16, the line receptor channels 93 in the spool are first aligned with the eyelets 78 in the side of the housing 14. Printed indicia such as an arrow 85 are preferably provided on the lower surface of the spool to facilitate alignment as shown in FIG. 15. The inner end portions 17" of two separate lengths of cutting line 17 are then inserted through the opposed eyelets 78 in the housing and pushed securely into the aligned receptor channels 93 in the spool flange 70. With the line and channel configurations illustrated in FIGS. 11J-11L, the line must also be twisted as above-described. The lengths of line are then bent at acute angles and pulled toward the spool body portion 74 against lateral guide walls 94. The spool is then manually rotated in a counterclockwise direction using the bumper 81 as a handle while maintaining the housing in a stationary disposition. The preferably tapered and angularly disposed walls defining the receptor channels will tightly grip the inner ends of the cutting line, preventing their withdrawal from the channel. As rotation of the spool in a counterclockwise direction continues, the two lengths of cutting line will be wound about the spools.

Manual rotation of the spool in a counterclockwise direction with respect to the housing 14 also will cause corresponding rotation of the cam follower 20 with respect to the cam member 18, bringing the inclined slide surfaces 56b on abutment members 56 into abutment with the oppositely inclined slide surfaces 46b on the lower cam 46 (see FIG. 8A). Because surfaces 56b and 46b are inclined in opposite directions, continued counterclockwise rotation of the spool while maintaining the housing stationary will cause the abutment members 56 on the cam follower to ride upwardly on and over the slide surfaces 46b on the lower cam 46. As the cam follower 20 moves upwardly with respect to the cutting head housing 14 so does the spool 16. This movement is illustrated in FIG. 8B. When the cam follower 20 is rotated to the point that the trailing corners of the lower cam 46 become aligned with relief areas 60 in the cam follower, the cam follower and thus spool 16 will snap downwardly under the force of coil spring 22 to their original elevations with respect to the housing wherein the cam surfaces 46a on the cam member are aligned with the cam abutment surfaces 56a on the cam follower. Thus, continual manual rotation of the spool with respect to the housing in the counterclockwise direction will effect continual vertical ratcheting or reciprocation of the spool within the housing as the two lengths of cutting line are pulled inwardly through eyelets 78 and wound about the spool.

This reciprocating movement of the rotating spool provides for an even distribution of the cutting line about the spool, even though the vertical distance traveled by the spool relative to the housing is less than the distance between the upper and lower spool flanges 70 and 72 as the two lengths of line enter the spool area from opposed sides of the spool and are separately directed toward the center of the spool by the outlet ends of the line receptors. As a result, the lengths of line tend to roll over themselves and fill the spool without becoming entangled on the spool.

The above description of the trimmer head 10 and its components is based on using the head on a conventional rotary trimmer in which the gear box (not shown) typically imparts a counterclockwise rotation to the drive shaft 12 and thus to the trimmer head. If the head were used on a trimmer without a gear box or with one that imparted a clockwise rotation to the head, the leading and trailing surfaces on the cams and cam follower abutment members would simply be reversed. Accordingly, it would simply be necessary to reverse the orientation of the cam and slide surfaces on the lower cam 46 and on the abutment members 56 on the cam follower 20. The cam surfaces 46a on the lower cam would then still be on the leading surfaces 46' of cam 46 and the slide surfaces 46b on the trailing sides. Similarly, the cam abutment surfaces 56a would then still be on the trailing side of each abutment member and the slide surfaces 56b would still be on the leading sides.

Figure 16:
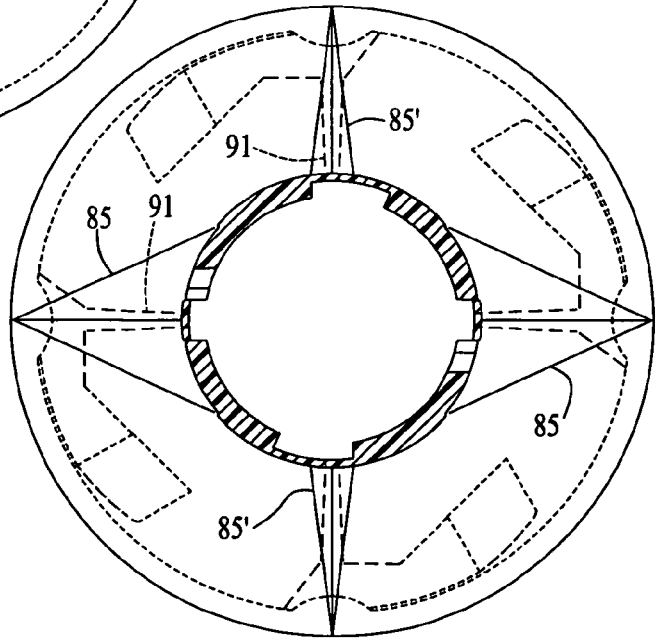
FIG. 16 is a bottom plan view of an alternate embodiment of the spool employing a second opposed pair of line receptors for accommodating different sized line.

While the spool 16 has been described and illustrated comprising two diametrically opposed line receptors 91, one such receptor could be employed if a single line head was desired or, alternatively, multiple equally spaced receptors could be utilized. In addition, two pair of opposed receptors of different sizes could be employed to provide additional versatility for the cutting head. For example, in addition to the receptors shown in the drawings and described above, a second pair of line receptors slightly larger in cross sectional dimension could be employed with each pair of opposed receptors being perpendicular to the other pair to balance the head. Through such a configuration, one pair of opposed receptors could be sized to accommodate, for example, small diameter cutting line such as 0.065 in., 0.080 in. and 0.095 in. line, while the second pair of receptors could accommodate larger diameter line such as 0.095 in., 0.105 in. and 0.130 in. For such applications, a second pair of indicia would be imprinted on the upper surface of the spool to assist in the alignment of the second pair of line receptors with the line outlet eyelets and indicate which pair of receptors accommodated the larger and smaller line sizes. For example, a pair of smaller or narrower arrows 85' could be perpendicularly disposed with respect to an opposed pair of layer arrows 85" as shown in FIG. 16 to identify the channel size and align the lengths of cutting line.

Fully assembled, and loaded with cutting line, the cam member 18 is located within the chamber 54 in the cam follower 20 with its hexagonally-shaped head portion 42 disposed within the correspondingly configured portion 40 of channel 34 defined by the housing tubular extension 30. The coil spring 22 is disposed between and bears against the shoulder 32 formed by the housing extension 30 and the upper surface of the cam follower 20 defined by cylindrical wall 52 and projections 56, urging the cam follower 20 downwardly about the cam member 18 such that the undersides of abutment members 56 on the cam follower about the upper surface of the skirt portion 48 of the cam member. A 5/16-inch or other suitably sized push-type retainer or pal nut 25 (also referred to as a push nut or bolt retainer) is slid onto the cylindrical lower end of the shaft portion 24c of the drive bolt 24 snugly against the underside of skirt 48 on the cam member 18. The shaft portion 24c of the drive bolt can be threaded or smooth and push-type retainers, such as those shown and described in the 2003 edition of the *McMaster-Carr Catalog* at page 2982, are available for threaded as well as unthreaded bolts. By providing the shaft portion 24c of the drive bolt with threads, a conventional threaded hex nut could be used for repairs in the field, if necessary, and if a push-type retainer were not available. The use of a push-type retainer, however, allows for simple and totally automated assembly of trimmer head 10 which is an object of the present invention.

The spool 16 is disposed within the interior of housing 14 with two of the lugs 62 thereon being disposed in the offset portion of locking channels 82 projecting through apertures 92 and the remaining two lugs being disposed at the bottom of the two guide channels 88. The bumper 81 on the bottom of spool 16 projects downwardly from the lower end of the housing 14 as seen in FIG. 1 and the extended ends of the cutting line 17 project through the opposed eyelets 78 in the housing skirt 28.

Figure 13:
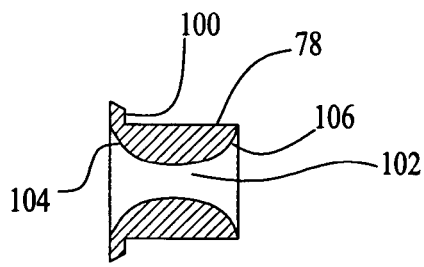
FIG. 13 is a sectional view of one of the trimmer head eyelets.

The eyelets 78 preferably employed with the present invention are constructed of aircraft grade aluminum and each define annular retention flanges 100 at their inner ends and radially extending channels 102 for the passage of the cutting line therethrough and into receptors 91. As seen in FIG. 13, the inner and outer end portions 104 and 106 of channels 102 are radiused to eliminate any sharp corners and accommodate bending of the line about the eyelets without crimping or overly stressing the line. This eyelet configuration allows the eyelets 78 to be attached to the head 10 in an automated process and be held in place by flange 100 and the centrifugal force generated thereon during use.

In operation, the rotating drive shaft 12 on the trimmer effects corresponding rotation of the housing 14 and the cam member 18 due to the fitment between the drive bolt 24, drive shaft 12 and the tubular extension 30 of housing 14. The cam follower 20 is pressed downwardly about the cam member 18 such that the undersides of projections 56 on the cam follower abut the skirt portion 48 of the cam member 18 and the cam surfaces 46a on the lower cam 46 are aligned with and bear against the abutment surfaces 56a defined by the abutment members 56 on the cam follower 20 to effect corresponding counterclockwise rotation of the cam follower and the spool carried thereby as seen from above in FIG. 6. By providing the skirt portion 48 of the cam member 18 with a vertical length of about 0.5 inches, as opposed to using a thinner disc configuration, any wobble of the cam member within the cam follower during use is minimized.

Upon pressing the rotating bumper 81 on the bottom of the spool 16 against the ground or other rigid surface, the trimmer housing 14 and the cam member 18 which is secured thereto by drive bolt 24 and retainer 25 are forced downwardly, compressing coil spring 22 and disengaging the lower cam 46 from the abutment surfaces 56a on the cam follower. As the cam member 18 moves downwardly until the lower end of 30' of the tubular extension 30 abuts the upper surface of the upper cam 44, the lower cam passes out of the path of engagement with the cam abutment surfaces on the cam follower and the cam surfaces 44a on the upper cam 44 are brought into the path of cam abutment surfaces 56a. This causes a slowing of the rotation of the cam follower 20 relative to the cam member 18 and thus of the spool 16 relative to the cam member 18 and housing 14. When the upper cam surfaces 44a strike the abutment surfaces 56a, corresponding rotation of the cam and cam follower resumes (see FIG. 7). However, during the interim the cam member and housing rotate 45° relative to the cam follower and spool.

Once the force of the bump is dissipated, the coil spring 22 forces the spool and housing back to their initial positions, releasing the engagement of cam surfaces 44a on the upper cam 44 from the cam follower abutment surfaces 56a, re-engaging cam surfaces 46a and allowing another 45° of relative rotation of the cam member and cam follower and thus of the spool and the housing for a total of 90° of rotation during the bump, regardless of the time duration of the bump. During these periods relative rotation in which the spool lags behind the housing, centrifugal force causes a predetermined amount of fresh cutting line to be paid out through the opposed eyelets 78 in the trimmer housing. The worn line is then severed by a conventional cutting blade (not shown) carried by a protective cover (not shown) mounted on the trimmer above and radially spaced from the rotating head 10.

It should be noted that the cam follower 20 includes relief areas 60 between projections 56 so that the cams 44 and 46 can slide vertically with respect to the cam follower 20 when the cams 44 and 46 are in the line feeding positions relative to the cam follower shown in FIGS. 6 and 7, and to allow spool reciprocation during line loading but at no other times. In the position illustrated in FIG. 7, the cams 44 and 46 are free to slide upwardly to disengage the cam surfaces 44a and in FIG. 6, free to slide downwardly to disengage the cam surfaces 46a. Cams having three or more or differently configured cam surfaces are also possible, with four-sided cams 44 and 46 being a practical comprise between the surface area contact, ease of manufacture, and the desired line feed out. Also, in lieu of square cams defining the cam and slide surfaces adjacent the corners thereof, the angularly offset upper and lower cams could each have four recessed side walls and define four equally-spaced radial projections or tangs at the four corners. The leading and trailing edges of the tangs would then define the cam and sliding surfaces. Such a cam member would be operable without the need to modify the cam follower 18.

In the preferred embodiment of cutting head housing 14, a recessed area 99 is provided in the housing skirt 28 to define a "window" for a label. As the surface 99' on which the label would be affixed is offset from the remainder of the housing skirt, the label is protected during use.

Alternate embodiments of the housing and drive bolt usable in the present invention are illustrated in FIG. 12. These embodiments differ from the prior embodiments in that the drive bolt 124 is pushed upwardly through the lower hexagonally-shaped portion 140 of the interior housing extension 130 for assembly. The tubular extension 130 of the modified housing 114 defines a cylindrical upper portion 136 having a raised annular ridge 137 extending about the interior side wall thereof and an extended hexagonally-shaped lower portion 140. The drive bolt 124 defines a cylindrical upper portion 124a having an annular groove 124e formed therein, a hexagonally-shaped mid-portion 124b and a reduced diameter cylindrical shaft portion 124c, which, as with the shaft portion 24c of drive bolt 24 can be threaded or smooth. Upon inserting drive bolt 124 into tubular extension 130, the ridge 137 in the upper portion of the bolt provide an interference fit to retain the bolt within the housing. If the bolt is pushed into place just after the housing has been formed, the nylon material will shrink about the bolt as it cools, enhancing the securement. However, even if the bolt is inserted into the housing extension long after the housing is formed and cooling, the snap fitment between the bolt and housing extension will retain the bolt in place.

The cylindrical upper portion 124a of drive bolt 124 has a threaded cylindrical bore 124d extending axially therethrough and into the hexagonal portion 124b for threaded engagement with the drive shaft 12 of the trimmer, similar to the prior embodiment. However, if desired, the bolt 124 could be provided with a threaded extension (not shown) adapted to engage a trimmer drive shaft having a threaded female end. This same change could, of course, be employed with drive bolt 24. The hexagonally-shaped portion 124b of the drive bolt is received within an upper portion of the hexagonally-shaped portion 140 of the housing extension 130 and, upon securement of the cam member 18 and cam follower 20 is disposed immediately adjacent the hexagonally-shaped head portion 42 of the cam member. As in the prior embodiment, the shaft portion 124c of drive bolt 124 projects downwardly beyond the end of the housing extension 130 and through the cam member 18 for engagement with a push retainer 25. The remainder of the elements also are identical to the corresponding elements of the prior embodiment. As with the prior embodiment, this embodiment can be assembled in a totally automated process with a minimal number of parts and without the need for chemical bonding elements which are susceptible to heat and/or prevent part replacement.

A second embodiment of the present invention is illustrated in FIGS. 20-31 wherein the line loading mechanism is employed in a manual trimmer head 100. Head 100 is also mounted on the extended end of a rotatable drive shaft on a gasoline or electric powered rotary trimmer. The trimmer head 100 generally comprises a housing 114, a spool 116 for carrying one or more lengths of coiled monofilament nylon cutting line 17, a coil spring 122, drive bolt 124 and a wing nut 125 for securing the spool 116 to the trimmer head housing 114.

The trimmer housing and spool are preferably formed of the same material as the corresponding components of the prior embodiment. The housing 114 defines an upper circular wall 126, a cylindrical skirt 128 depending therefrom and a centrally disposed tubular extension 130. Extension 130 is axially aligned with the central axis of rotation "Y" of the head and includes a depending portion 130a and an upwardly projecting portion 130b. The tubular extension 130 is configured to receive the drive bolt 124 with the upwardly projecting portion 130b preferably being square in cross section to mate with the square head portion 124a of the bolt and the depending portion 130a being of a reduced constant radius to receive the cylindrical body portion 124b of the drive bolt. The lower shaft portion 124c extends downwardly into and through the interior of the housing and into the spool where it is threadably engaged by the wing nut 125 as will be described (see, e.g. FIG. 29).

The drive bolt 124 also defines an internally threaded cylindrical bore (not shown) extending axially through the head portion and a substantial part of the central portion 124b of the bolt for threaded engagement with the drive shaft of the trimmer as in the bump-feed head of the prior embodiment. Thus, with the drive bolt 124 disposed in the tubular extension 130 of the trimmer head housing 114 and in threaded engagement with the drive shaft, rotation of the drive shaft imparts a corresponding rotation of the drive bolt and housing (generally counterclockwise) due to the interference fit between the square head portion 124a of the drive bolt and the upper portion 130b of extension 130. Again, the head portion of the drive bolt and the cross section of the upper portion of the tubular extension in the housing could be formed of different shapes other than square to form the desired interference fit.

The trimmer head housing 114 also defines a pair of opposed slots 180 in the depending cylindrical housing skirt 128. Slots 180 are open at their lower ends and are adapted to slidably receive a pair of opposed outlet eyelets 178 in a press fitment. Alternatively, the eyelets could be press fit through apertures in the housing skirt as in the prior embodiment. Again, the portions of the housing skirt 128 adjacent the eyelets preferably are raised or ramped outwardly to protect the eyelets from foreign objects during use. A plurality of radially projecting heat dissipation ribs 115 are formed on the upper wall 126 of housing 114 that extend upwardly along the upper portion 130b of tubular extension 130. The heat dissipation ribs 115 are preferably provided with sharpened surfaces 117 for severing weeds that may wrap about the drive shaft adjacent the trimmer head housing during use. A plurality of equally-spaced drive lug receiving apertures 119 extend axially through the upper wall 126 of the trimmer housing which are adapted to receive the upwardly extending projections defining drive lugs 121 on the spool 116 as will be described.

Figure 39:
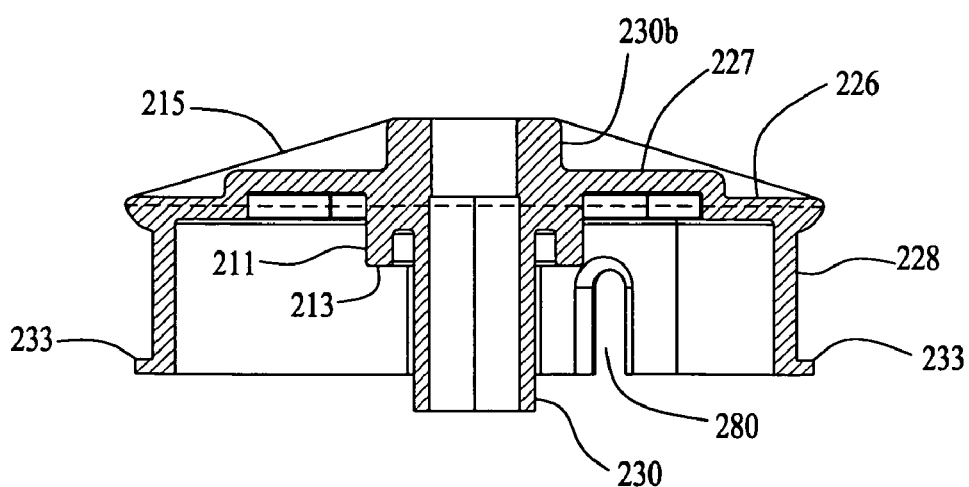
FIG. 39 is a cross-sectional view taken along the line 39-39 in FIG. 38.

The trimmer head spool 116 defines an upper annular flange 170 and a lower annular flange 172 carried by a cylindrical upper body portion 174 so as to define an annular area 176 between flanges 170 and 172 for carrying coils of flexible nylon cutting line 17 wrapped about body portion 174 such that upon assembly, the end portions 17' of the cutting line will extend outwardly through the outlet eyelets 178. The spool also includes a lower body portion 175 depending from the lower flange 172. Spool 116 further includes a depending cylindrical extension 131 which, upon assembly, is axially aligned with the tubular extension 130 on the trimmer head housing 114 as seen in FIG. 39 such that the threaded lower shaft portion 124c on the drive bolt 124 extends therethrough and into the area circumscribed by the lower body portion 175 of the spool where the shaft portion is threadably engaged by the wing nut 125.

A coil spring 122 extends about the depending extension 131 in the spool, bears against and extends between the underside of the upper spool flange 170 and an annular recessed surface 125' in the upper portion of wing nut 125. So secured, the spool 116 and trimmer head housing 114 are urged together by the coil spring 122. In the secured position, the drive lugs 121 project upwardly from the upper surface of flange 170 into the drive lug receiving apertures 119 in the trimmer head housing, securing the spool to the trimmer housing such that rotation of the housing by the drive bolt is imparted to the spool. To remove the spool from the trimmer head housing it is simply necessary to threadably disengage the wing nut 125 from the threaded lower shaft portion of the drive bolt.

To enable the trimmer line to be wrapped about the spool 116 without having to remove the spool from the housing, the upper spool flange 170 is provided with a pair of opposed line receptors 191 for gripping the inner end portions 17" of two separate lengths of cutting line 17. Spool 116 is sized and configured such that flange 170 is in planar alignment with the line outlet eyelets 178. Each of the line receptors 191, including the line receptor channels 193, is of the same configuration and functions in the same manner as the line receptors 91 in the prior embodiment. The dimensions may vary slightly depending on variations in the sizes of the respective spools and the diameter or diameters of the cutting line for which the head is designed.

Figure 26:
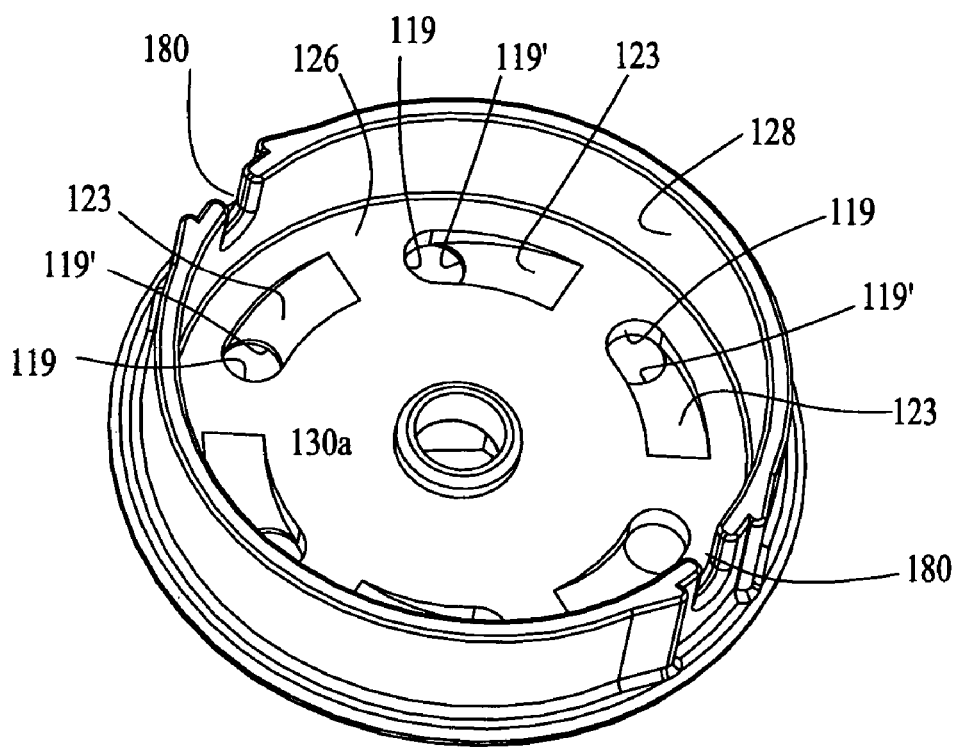
FIG. 26 is a perspective view of the underside of the housing of the second embodiment of the present invention showing the interior surface of the upper wall of the housing and the ratcheting ramps formed therein.
Figure 27:
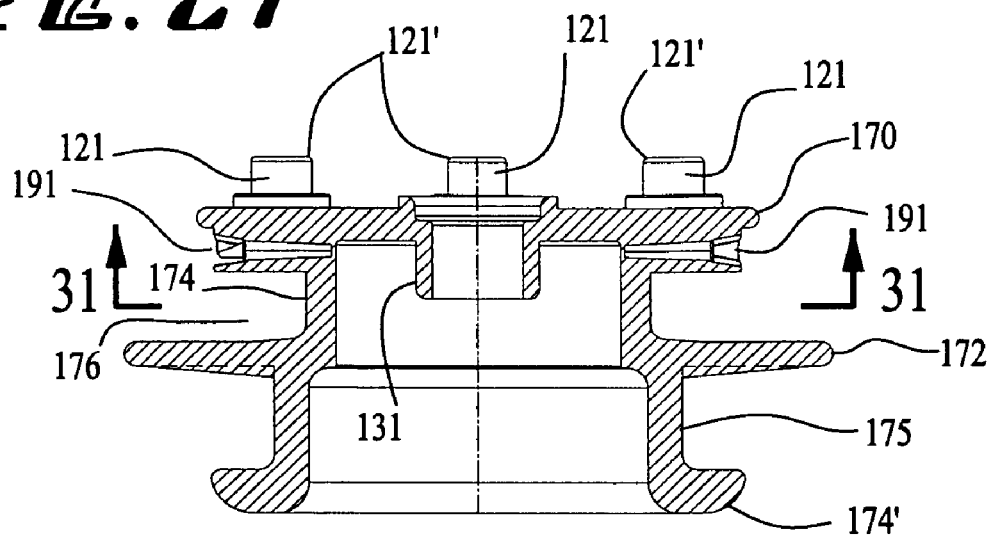
FIG. 27 is a sectional view of the spool of the second embodiment of the present invention.
Figure 28:
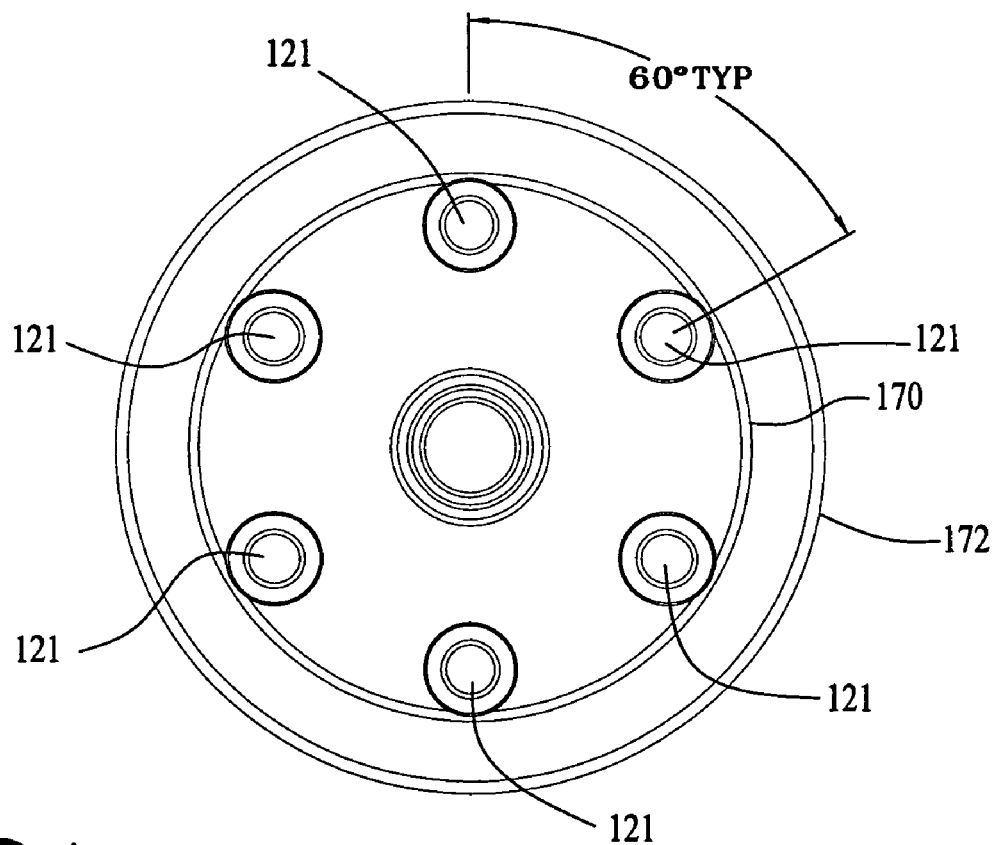
FIG. 28 is a top plan view of the spool of the second embodiment of the present invention.
Figure 29:
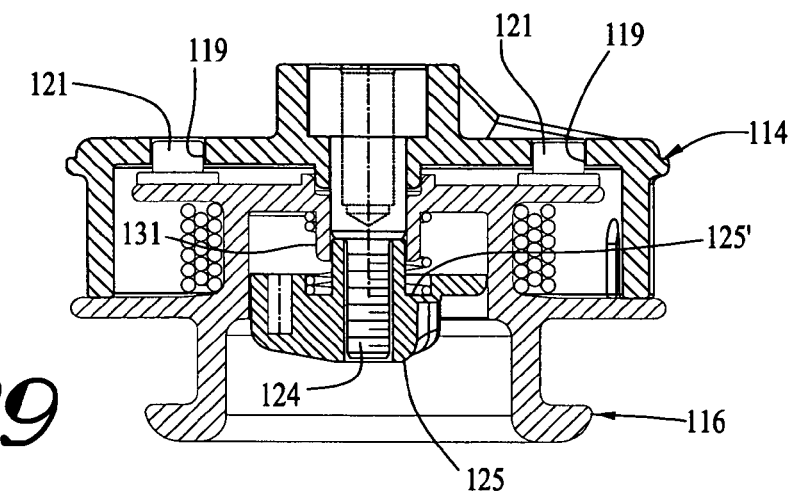
FIG. 29 is a sectional view of the of the second embodiment of the trimmer head of the present invention illustrating the spool and trimmer head housing in the drive mode.
Figure 30:
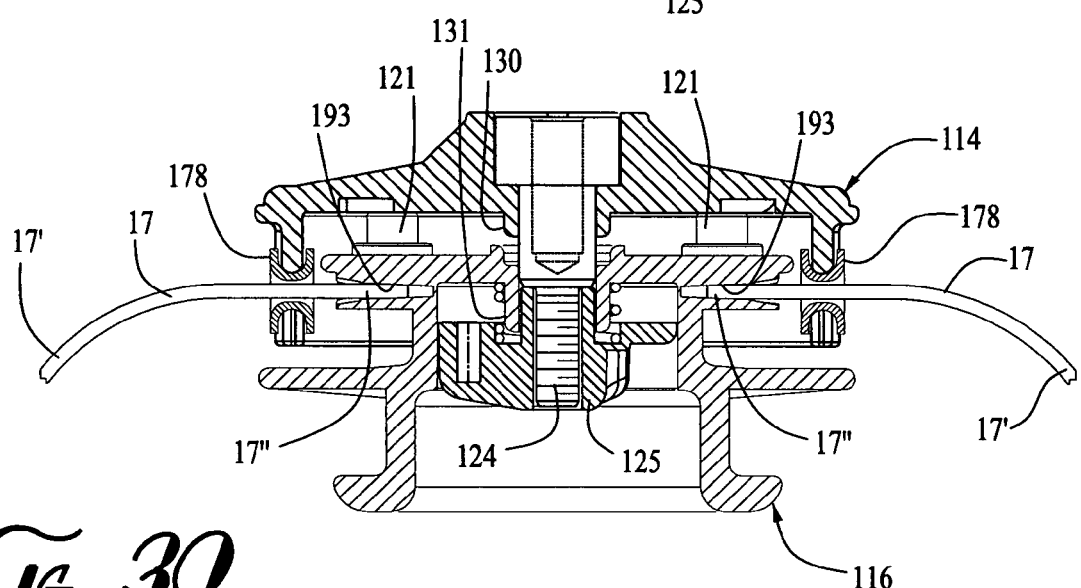
FIG. 30 is a sectional view of the of the second embodiment of the trimmer head of the present invention illustrating the spool and trimmer head housing in the initial line winding mode.
Figure 31:
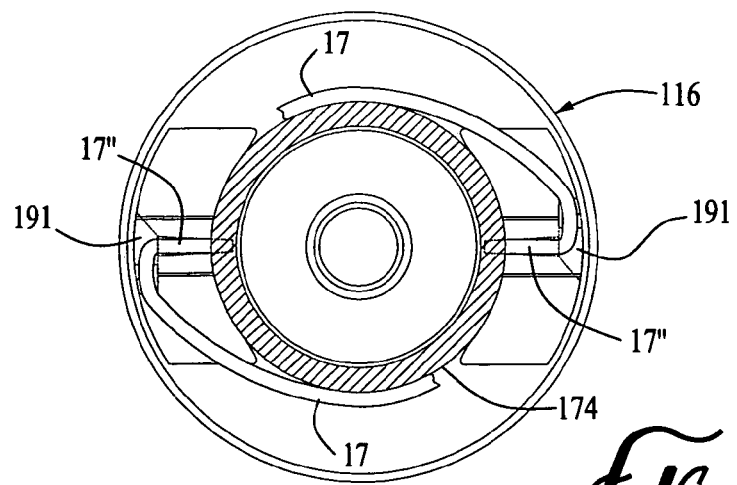
FIG. 31 is a cross-sectional view of the trimmer head spool of the second embodiment of the present invention taken along line 31-31 of FIG. 27 and showing the inner end portions of the cutting line being wound about the spool.
Figure 32:
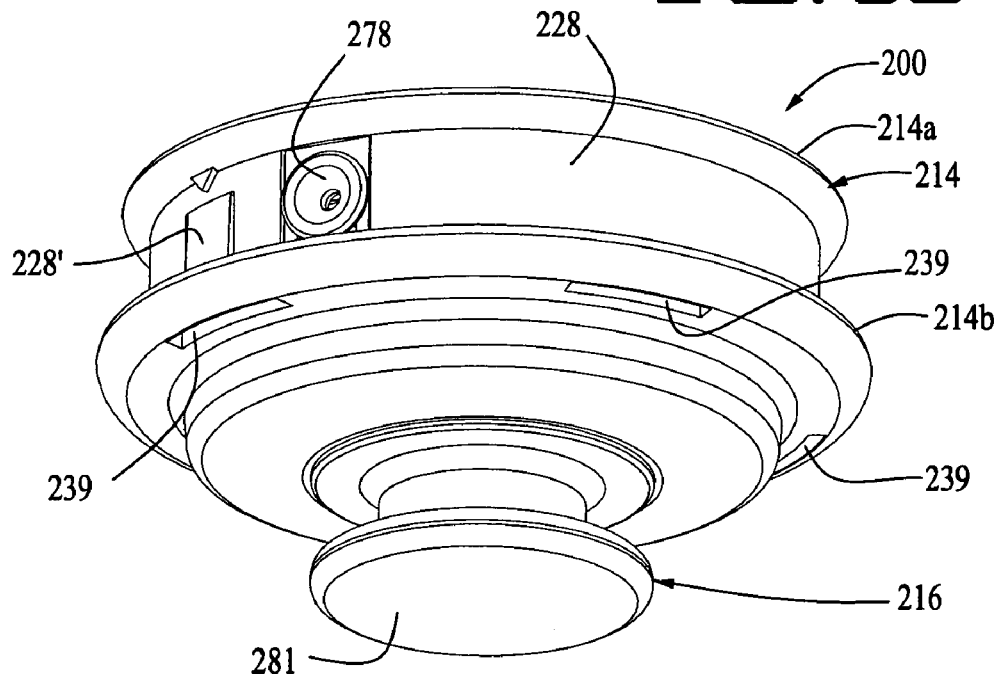
FIG. 32 is a perspective view of a third embodiment of the trimmer head of the present invention as seen from below.
Figure 33:
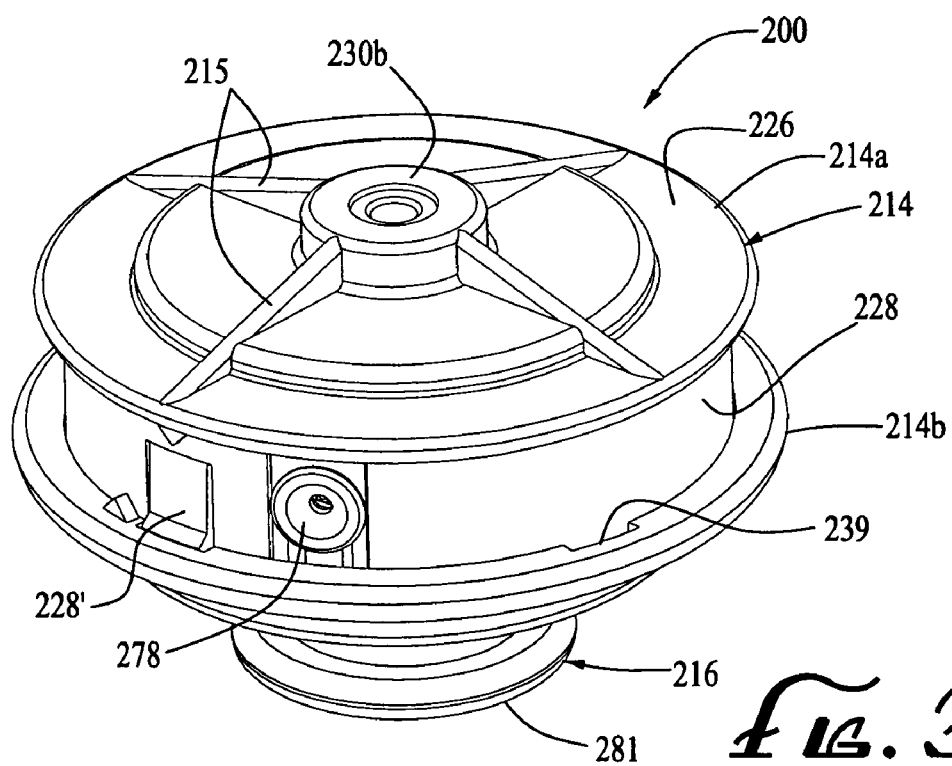
FIG. 33 is a perspective view of a third embodiment of the trimmer head of the present invention as seen from above.

In addition to the inclusion of the line receptors 191 on spool 116, the interior surface 126' of the upper wall 126 of the trimmer head housing 114 is provided with a plurality of arcuate inclined ramps 123. One such ramp is adjacent and extends from each lug receiving apertures 119 to the next aperture as seen in FIG. 26. In the embodiment of trimmer head 100 illustrated in the drawings, ramps 123 are configured such that they each extend along an arcuate path and at a downward inclination from a position laterally adjacent and slightly below the inner surface 126' of the upper housing wall 126 so as to define vertical steps 119' at the trailing sides of the lug receiving apertures. The ramps 123 then smoothly transition back into the inner surface 126' of the upper housing wall proximate the next in line of the lug receiving apertures 119. Thus, upon gripping the lower body portion 174' of the spool 116 and rotating the spool in a counterclockwise direction while holding the trimmer head housing stationary, the drive lugs will translate from their respective apertures 119 in the upper wall of the trimmer head housing about steps 119' onto and downwardly along the ramps to the inner surface 126' of the upper housing wall and then upwardly under the force of the spring 122 into the next-in-line lug receiving apertures. Thus, continual rotation of the spool relative to the housing will provide the same ratcheting or reciprocal movement of the spool within the housing as described above in discussing the first embodiment of the invention.

The steps 119' defined by the vertical spacing between the outer surface of the housing upper wall 126 and the upper ends of ramps 123 prevent any whipping or backlash in the line during use from causing a reverse rotation of the spool and inadvertent paying-out of line. Vertical steps of about 0.015 in.-0.025 in. in height have been employed for this purpose. To enable the drive lugs 121 to smoothly negotiate steps 119' under manual rotation of spool 116, the upper surfaces of the lugs (which are substantially flush with the upper surface of housing wall 126 in the drive position) are rounded at 121'. A radius of about 0.030 in. for surfaces 121' has been employed. While ramps 123 vertically align the upper spool flange 170 and thus the line receptors 191 therein with the eyelets 178 when the drive lugs 121 are rotated off the ramps and onto the inner housing wall surface 126', it may be preferable to size the spool 116 relative to the trimmer housing 114 such that the opposed line receptors would be radially aligned with the eyelets when the drive lugs 121 are disposed within lug receiving apertures. In either case, radial alignment between the receptors and eyelets is easily achieved.

Thus, as with the prior embodiment, the lengths of cutting line 17 are wound about the spool by pressing the extended ends of the line into the line receptors and rotating the spool relative to the housing as above described. As the spool is rotated, the lengths of line are bent acutely toward the inner portion of the spool as the line exits the receptor channels and is pulled against the flat lateral guide walls adjacent the channel outlets. As rotation of the spool continues, the spool reciprocates vertically with respect to the housing as a result of the drive lugs repeatedly moving along the downwardly inclined ramps and snapping upwardly into the next receiving aperture. As a result, the line is caused to be wound uniformly on the spool while avoiding line tangling as in the prior embodiment.

Finally, as in the prior embodiment, various changes in the configuration, number and sizes of the line receptors can be employed in the manual head 100 to provide the desired gripping of the line and accommodate different line sizes and, of course, the number of cutting lines extending from the cutting head. In addition, the orientation of the drive lugs 121, apertures 119 and ramp 123 could be altered or reversed. For example, the drive lugs could be formed on the interior of the upper housing wall and the apertures and adjacent ramps could be formed in the upper surface of the spool.

A third embodiment of the present invention is illustrated in FIGS. 32-44. The trimmer head 200 shown therein is a bump-feed type head having the drive and line feeding mechanism disclosed in U.S. Pat. No. 4,959,904 but modified to include the rapid line loading feature of the present invention. As will be seen, trimmer head 200 primarily differs from the bump-feed head 10 of the first embodiment in that the cam, cam abutment and slide surfaces defined by the axially mounted cam member 18 and cam follower 20 in head 10 are molded directly into the spool and trimmer head housing in trimmer head 200.

Trimmer head 200 comprises a housing 214, spool 216, coil spring 222 and drive bolt 224. The housing comprises an upper portion 214a and a lower portion 214b that are releasably secured together about the spool. The trimmer head housing and spool are again preferably formed of the same material as the corresponding elements of the prior embodiments. The upper housing 214a defines an upper circular wall 226, a cylindrical skirt 228 depending therefrom and a centrally disposed tubular extension 230. Extension 230 is axially aligned with the central axis of rotation of the head and includes a depending portion 230a and an upwardly projecting portion 230b. The tubular extension 230 is again configured to receive the drive bolt 224 with the upper portion 224a of the bolt being cylindrical in cross section and the lower portion 224b being hexagonal in cross section to mate with the hexagonal lower portion 230a of the tubular extension. The lower portion of the drive bolt and the tubular extension in the housing could also be square or otherwise configured to provide the desired interference fit between the drive bolt and housing. The drive bolt 224 is secured within the tubular extension 230 by heat shrinking the extension 230 about the bolt. An annular groove 224e is provided about the drive bolt to create an interference fit between the bolt and housing upon the shrinkage of the plastic housing material, to enhance the securement of the bolt to the housing. Other means for securing the drive bolt to the housing also could be employed. The drive bolt 224 also defines an internally threaded cylindrical bore 224f extending axially therethrough for threaded engagement with the drive shaft of the trimmer as in the prior embodiments. A second tubular extension 211 radially spaced from the depending portion 230a of extension 230 extends downwardly from the inner surface of the upper housing wall 226 to define at its lower end an upper annular seat 213 for the coil spring 222.

The upper portion of housing 214 also defines a pair of opposed slots 277 in the depending cylindrical housing skirt 228. As in the prior embodiment, the slots 280 are open at their lower ends and are adapted to receive a pair of opposed metal outlet eyelets 278 in a press fitment. Alternatively, the eyelets could be press fit through apertures in the housing skirt as in the first embodiment. Again, portions of the housing skirt adjacent the eyelets are preferably raised or ramped outwardly to protect the eyelets from foreign objects during use and a plurality of radially projecting heat dissipation ribs 215 are formed on the upper wall 226 of the upper housing. A plurality of equiangularly disposed and outwardly projecting radial tabs 233 also are provided at the lower end of the skirt 228 for the securement of the lower housing portion 214b to the upper portion 214a as will be described.

Figure 38:
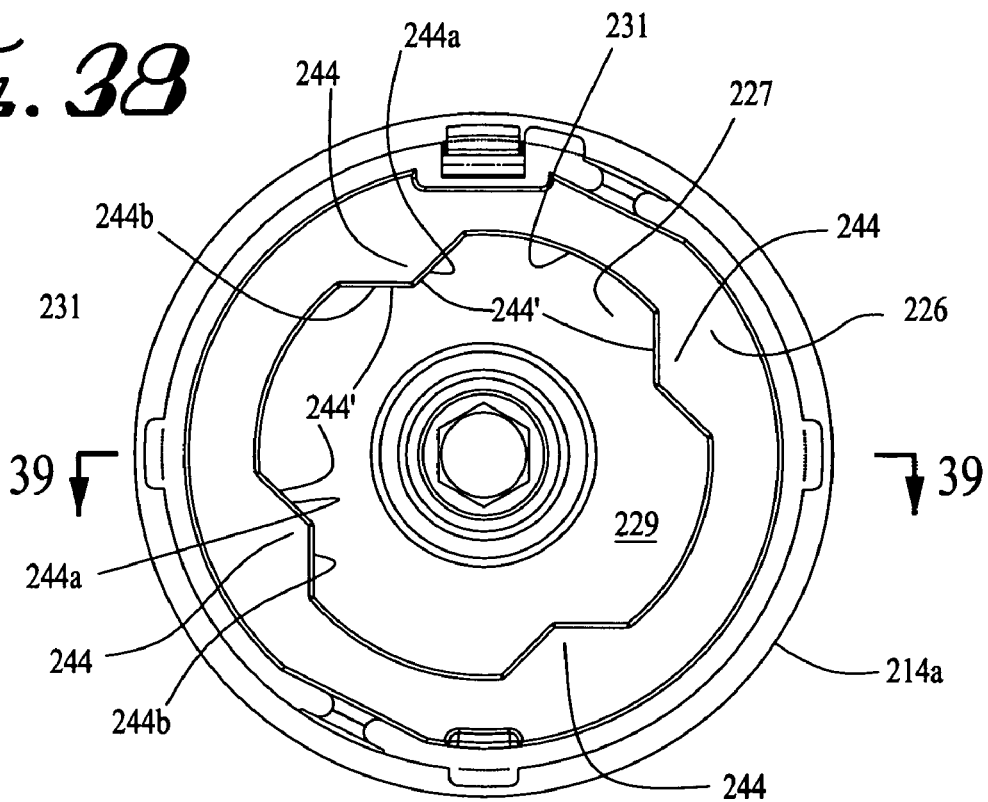
FIG. 38 is a bottom plan view of the upper portion of the housing of the third embodiment of the present invention.

The upper wall 226 of the trimmer head housing has a raised central portion 227 so as to define an interior recessed area 229 therein. As shown in FIG. 38, the perimeter wall surface 231 extending about the recessed area 229 defines four equiangularly disposed projections 244 that project radially inwardly from wall surface 231. Each of the projections defines a pair of angularly disposed surfaces 244' that offset by 135° and are parallel to the axis of rotation of the head. These projections are similar in configuration, albeit larger, to the projections 56 on the cam follower 20 of the first embodiment. Here, however, these projections will define cam surfaces as opposed to cam abutment surfaces.

The leading surface on each of the projections 244 defines an upper cam 244a (counterclockwise rotation as seen from above). The trailing surfaces each define an upper slide surface 244b. The surface of each of the cams is again parallel to the axis of rotation of the head. The upper slide surfaces 244b may be downwardly inclined, preferably radiused, particularly on smaller sized heads, to facilitate line loading as will be discussed.

Figure 35:
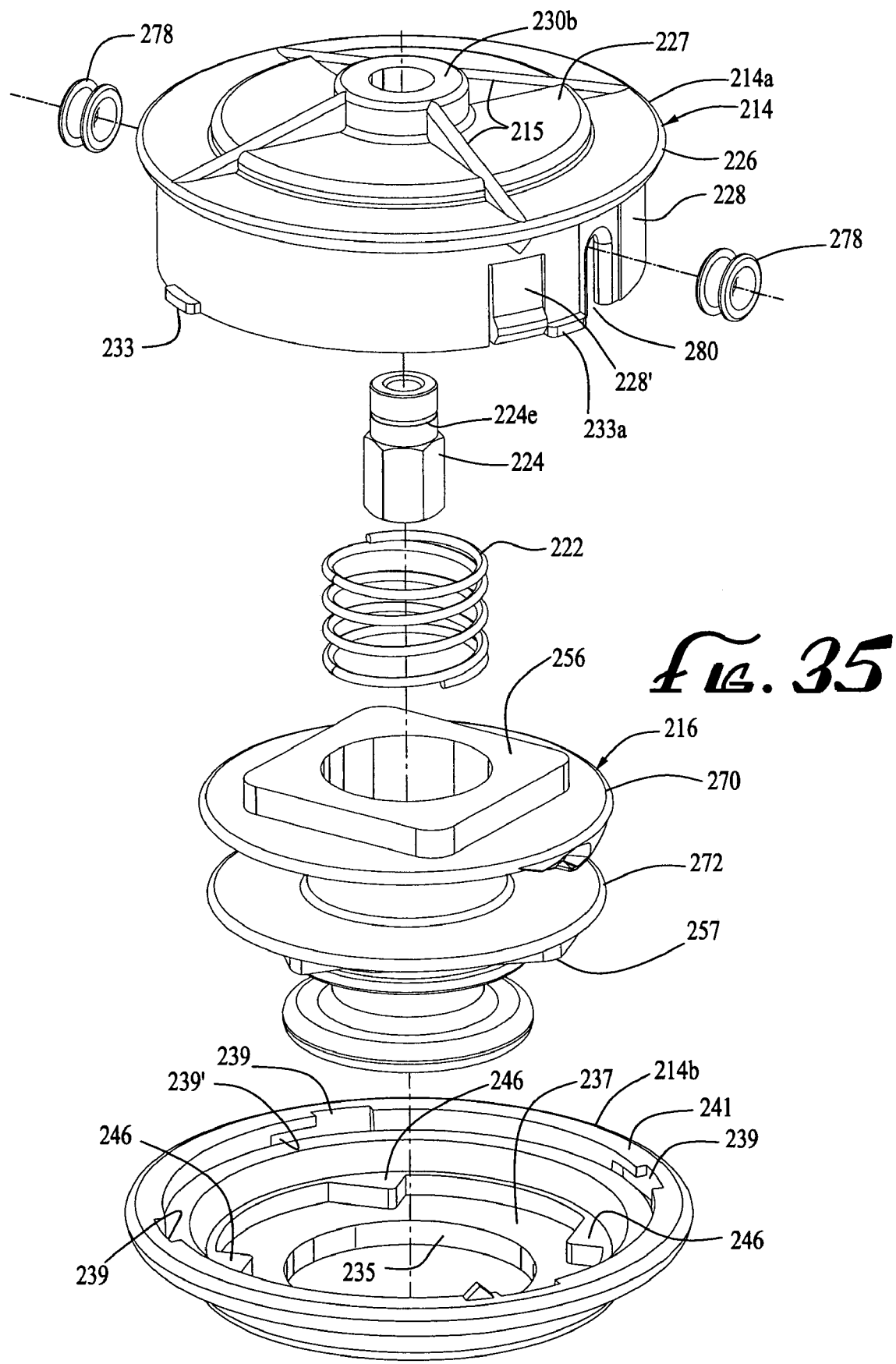
FIG. 35 is an exploded perspective view of the various elements comprising the third embodiment of the trimmer head similar to FIG. 34 but as viewed from above.

The lower housing portion 214b of the trimmer head 200 defines an enlarged circular opening 235 in the underside thereof, an annular horizontal surface 237 disposed about opening 235, and a plurality of equiangularly disposed slots 239 (four being shown) adjacent the upper surface 241 of the lower housing portion 214b for receiving a corresponding number of locking tabs 233 on the upper housing portion 214a. Slots 239 are provided with narrow offset portions 239' as seen in FIG. 35 and at least one of the locking tabs 233a is mounted on a cantilevered portion 228' of the housing skirt so as to be resilient such that upon inserting the rigid locking tabs 233 into three of the slots in the lower housing portion, pressing the resilient tab 233a radially inwardly and into the remaining aligned slot and rotating the upper portion of the housing counterclockwise with regard to the lower portion, the locking tabs will translate into the offset portions of the slots, releasably securing together the two housing portions.

Figure 40:
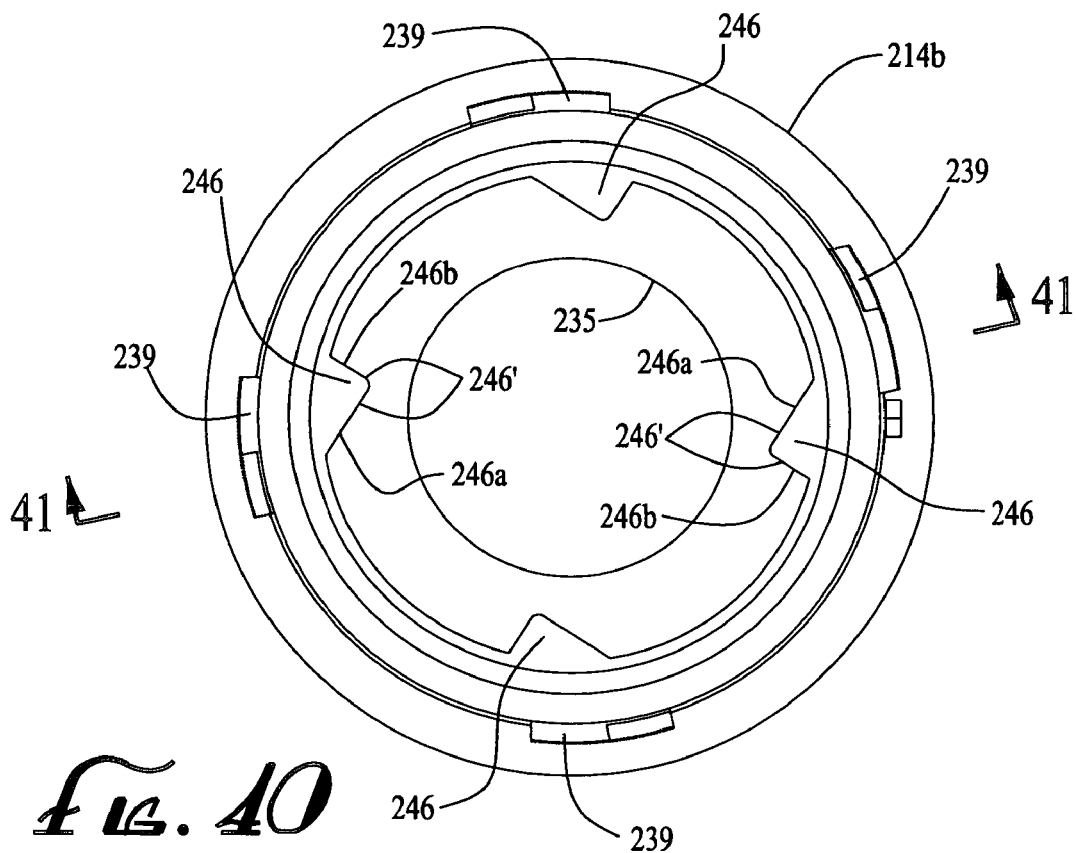
FIG. 40 is a top plan view of the lower portion of the housing in the third embodiment of the present invention.
Figure 41:
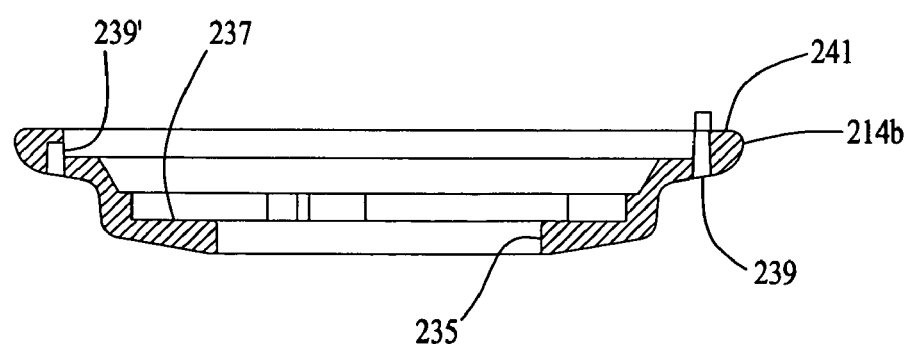
FIG. 41 is a cross-sectional view taken along the line 41-41 in FIG. 40.

The lower housing portion 214b further defines four equiangularly disposed projections 246 on the annular surface 237 adjacent opening 235 as seen in FIG. 40. The angularly disposed surfaces 246' on projections 246, like the surfaces 244' in the projections 244 in the upper housing portion, define angularly disposed lower cams 246a and lower slide surfaces 246b. The lower cams 246a are on the leading surfaces of the projections, extend parallel to the axis of rotation of the cutting head and again can be angled at 135° with respect to the adjacent slide surfaces. The slide surfaces 246b also can be radiused upwardly in the same manner as the slide surfaces 46b on the lower cam 46 in the first embodiment. In a preferred embodiment, however, the slide surfaces 246b on the lower projections 246 are not angled at 135° with respect to the cam surfaces 246a but at a lesser angle as seen in FIG. 40 to accommodate a preferred ramping configuration on the leading sides of the lower cam follower which is defined by the spool as will be described.

Figure 36:
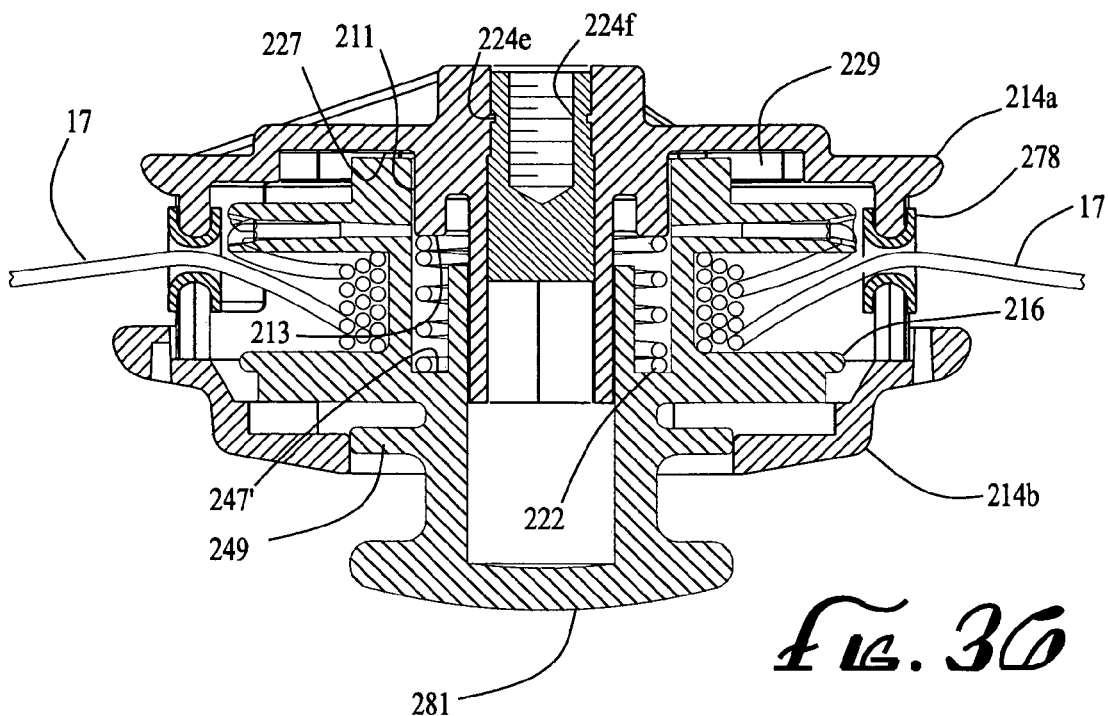
FIG. 36 is a sectional view of the of the third embodiment of the trimmer head of the present invention illustrating the spool and trimmer head housing in the line loading and bump-feed modes.
Figure 37:
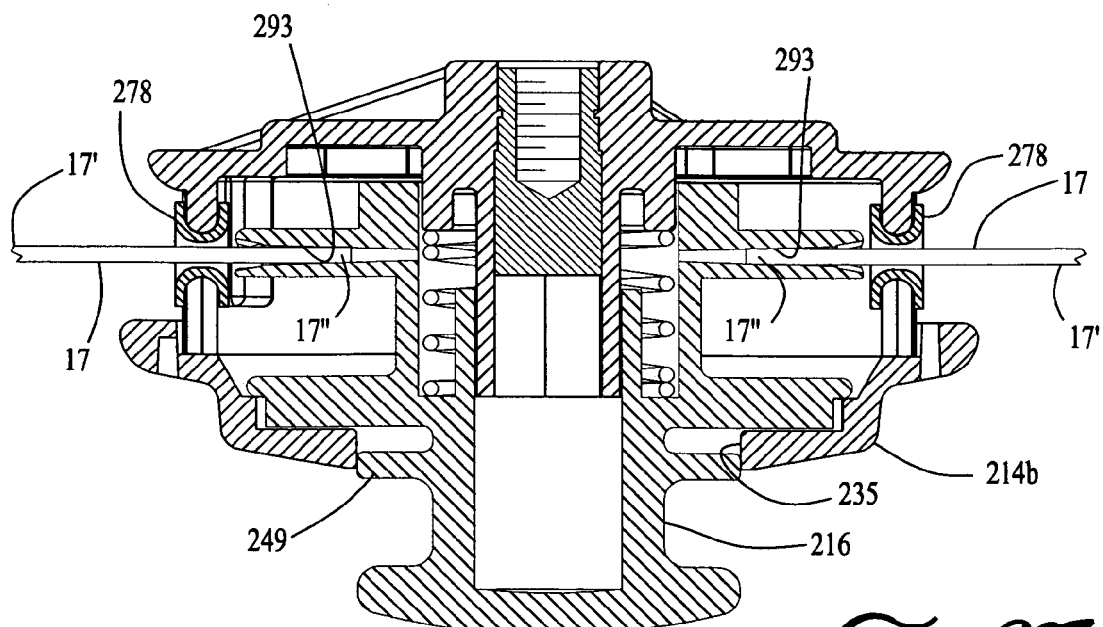
FIG. 37 is a sectional view of the of the third embodiment of the trimmer head of the present invention illustrating the spool and trimmer head housing in the initial line loading and drive modes.

The spool 216 in trimmer head 200 defines an upper flange 270 and a lower flange 272 carried by a cylindrical upper body portion 274 so as to define an annular area 276 between flanges 270 and 272 for carrying coils of flexible nylon cutting line 17 wrapped about body portion 274 such that upon assembly, the end portions 17' of the cutting line will extend outwardly through the outlet eyelets 278. A cylindrical chamber 243 is disposed about the central axis of rotation that is open at its upper end. An annular upstanding wall 245 is disposed in the lower end of chamber 243 so as to define an annular spring receiving area 247 and lower spring seat 247'. The lower body portion 275 of the spool terminates in a bumper 281 and a radial flange 249 extends outwardly from the lower spool body portion to prevent debris from becoming lodged between the spool 216 and the lower housing portion 214b (see FIG. 36). When head 200 is assembled, the coil spring 222 extends about extension 230 and bears against and extends between the upper seat 213 formed by the upper housing portion 214a and the lower spring seat 247' in the spool 216 as seen in FIGS. 36 and 37. The bumper 281 on the bottom of the spool projects through the opening 235 in the bottom of the lower housing portion 214b such that it can be bumped against the ground to pay out additional cutting line through the opposed eyelets 278 as in the first embodiment.

Figure 42:
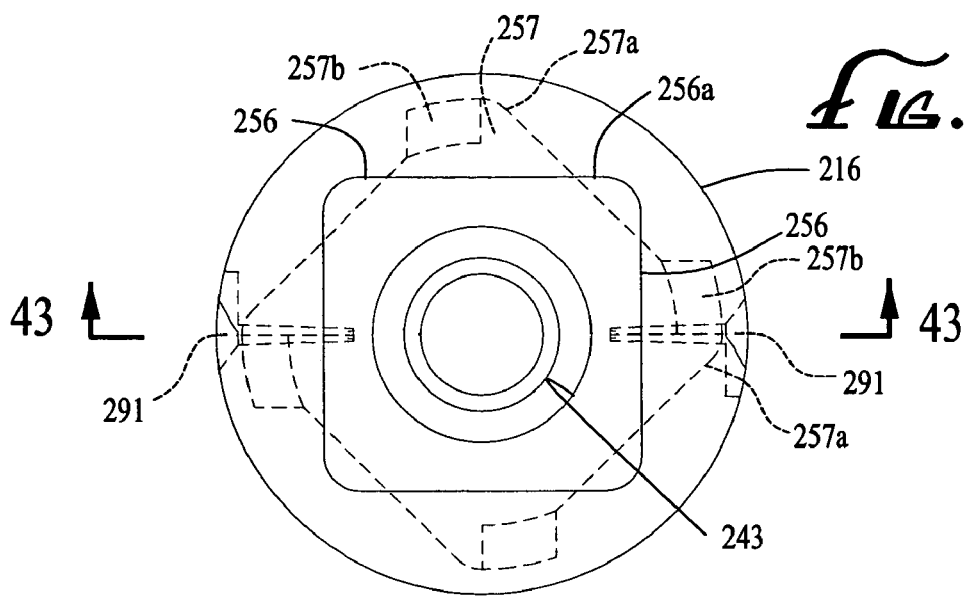
FIG. 42 is a top view of the spool of the present invention showing the relative positioning of the lower cam follower with respect to the upper cam follower with the lower cam follower and line receptors being shown in dotted lines.
Figure 43:
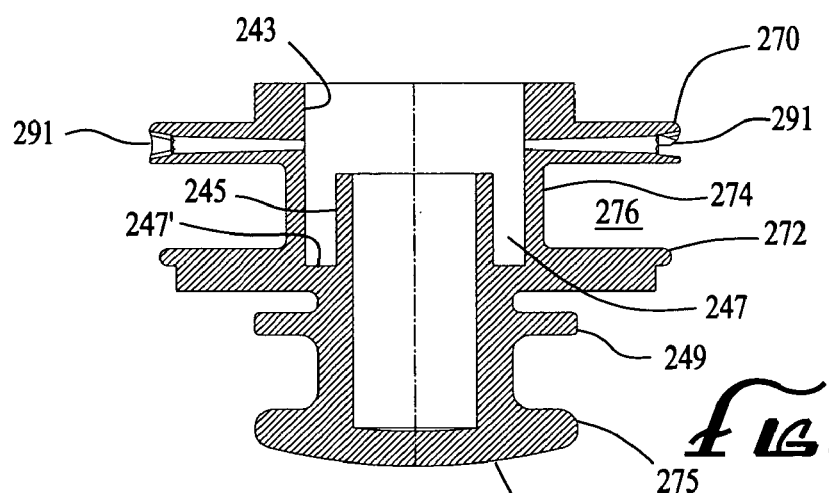
FIG. 43 is a cross-sectional view taken along the line 43-43 in FIG. 42.
Figure 44:
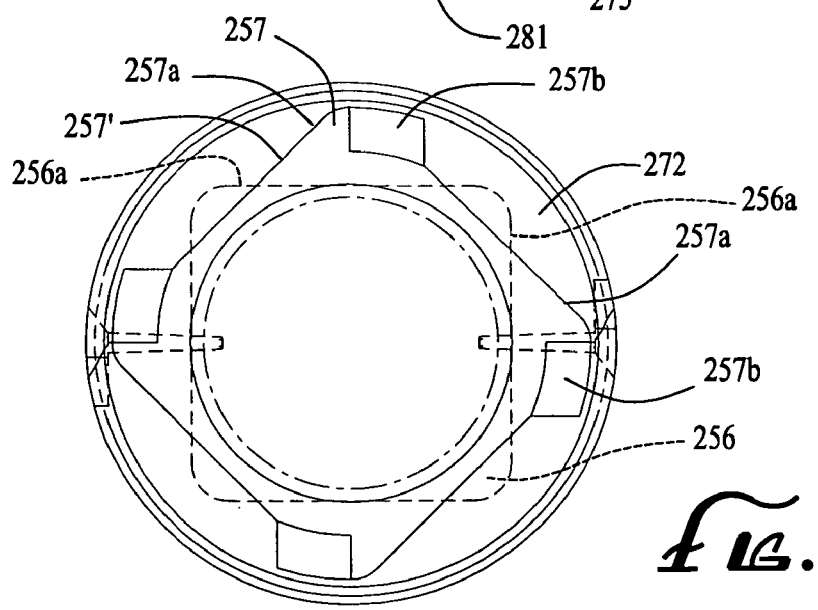
FIG. 44 is a bottom plan view of the spool of the third embodiment of the trimmer head of the present invention showing the relative positioning of the upper cam follower with respect to the lower cam follower with the upper cam follower and line receptors being shown in dotted lines.

The upper flange 270 on spool 216 defines an upper cam follower 256 on its upper surface and the lower spool flange 272 defines a lower cam follower 257 on its lower surface as seen in FIGS. 42-44. While other configurations could be employed, both cam followers are preferably of a square configuration, defining four perpendicular surfaces 256' and 257' respectively, and are offset by 45° with respect to the central axis of rotation of the trimmer head. The cam abutment surfaces 256a and 257a defined by the trailing surfaces of the upper and lower cam followers are again parallel to the axis of rotation of the head. The leading surfaces of the lower cam follower which define sliding surfaces 257b may be inclined upwardly proximate the corners thereon so as to provide smoother ratcheting if needed. Also, the leading surfaces of the upper cam follower may also be inclined downwardly to facilitate line feeding. Such a downward inclination of the trailing edges 256b is believed to be particularly necessary on the smaller heads where the length of each of the cam follower surfaces is shorter which otherwise might make the relative rotation of the spool and housing during line winding more difficult. It may also prove desirable to incline the trailing surfaces of the upper and lower cams.

Figure 34:
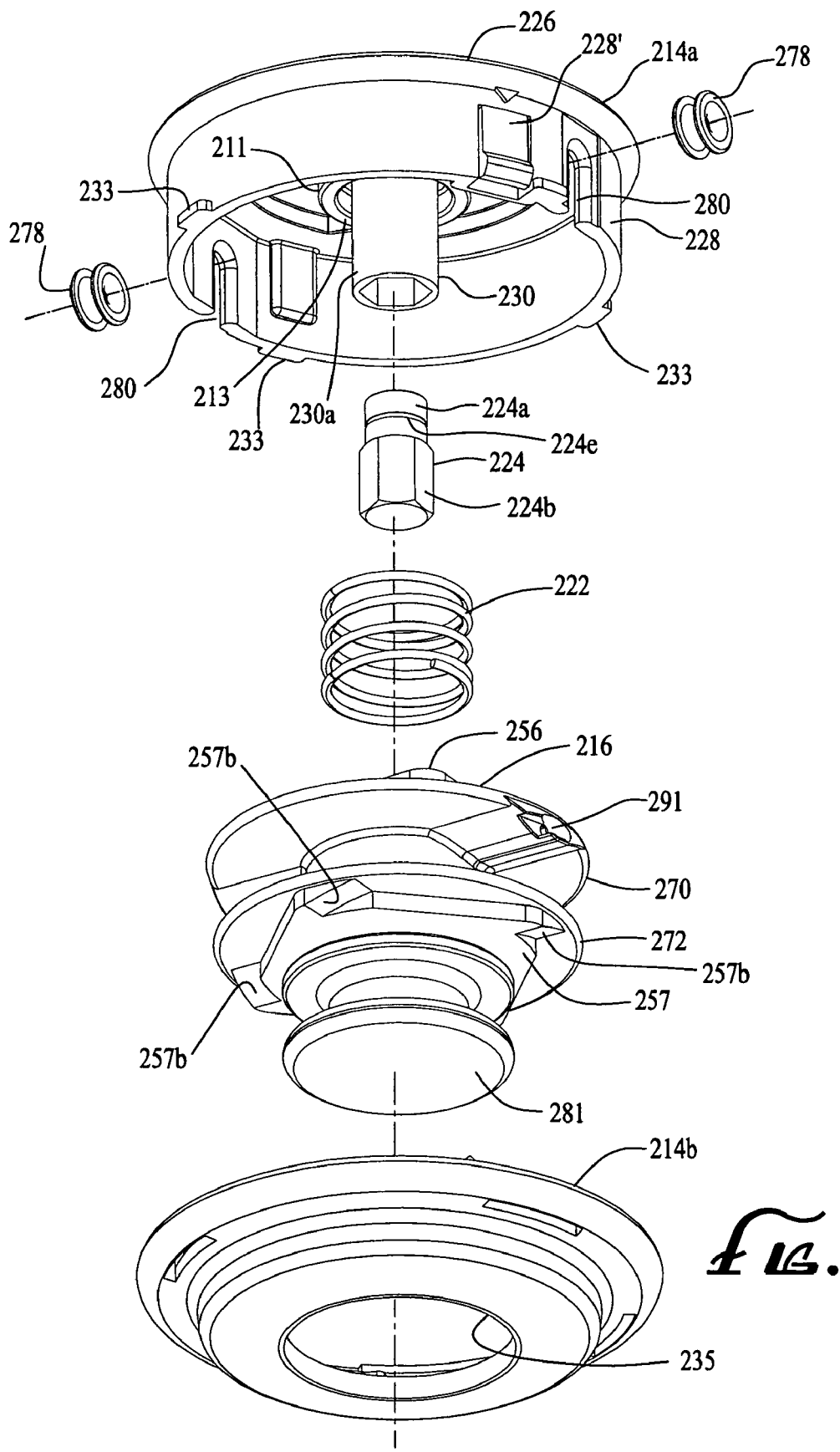
FIG. 34 is an exploded perspective view as seen from below of the various elements comprising the third embodiment of the trimmer head of the present invention illustrated in FIGS. 20 and 21.

In the preferred configuration, the sliding surfaces 257b on the lower cam follower are defined by inclined ramps as seen in FIGS. 34, 42 and 44 to provide a smoother ratcheting of the spool during the winding of the cutting line thereon due to the more gradual incline than that which would be provided by radiused surfaces. As noted earlier, the corresponding slides surfaces 246b on the projections 246 defined by the lower housing portion are inclined inwardly more sharply than the corresponding surfaces on the projections 244 on the upper housing portion 214a to provide more space adjacent the slide surfaces on the projections 246 to accommodate these inclined ramps on projections 224 when the spool 216 translates upwardly as occurs when the trimmer head is bumped against the ground to pay out fresh line and during the manual rotation of the spool to effect the winding of the cutting line thereon.

The operation of the bump-feed mechanism provided by the upper and lower cams and cam followers is explained in detail in the referenced U.S. Pat. No. 4,959,904. It should be noted, however, that the cam followers carried by the upper and lower spool flanges in head 200 are identified as upper and lower cams in the referenced patent and the upper and lower cams in head 200 are referred to as cam followers in the referenced patent. As explained in the cited reference in more detail, during use, the lower cams 246a on the lower housing portion 214b are aligned with and abut the lower cam abutment surfaces on the trailing surfaces of the lower cam follower 257. Accordingly, as the housing is rotated in a counterclockwise direction by the trimmer drive, the spool is rotated with the housing. In this drive position, the upper cams 244a are upwardly spaced from upper cam follower 256 so that the driving force is generated solely by the lower cams. When the bumper 281 is pressed against the ground, the spool 216 is forced upwardly within the housing disengaging the lower cam abutment surfaces 257a on the lower cam follower from the lower cams 246 and bringing the upper cam abutment surfaces 256a on the upper cam follower 256 into alignment and immediate abutment with the upper cams 244a whereupon the driving force is effected solely by the upper cams. When the bumper 281 is lifted from the ground, the coil spring 222 forces the spool downwardly, disengaging the upper cam follower from the upper cams and re-engaging the lower cam follower with the lower cams. Thus, as with the first embodiment of the invention, with each bump on the ground effects a relative rotation of the spool and housing of 90° results, regardless of the duration of the bump. During this relative rotation, centrifugal force causes a predetermined amount of fresh cutting line to be paid out through the opposed eyelets 278 in the trimmer head housing.

To provide the rapid loading of the trimmer line about spool 216, the upper spool flange 270 is provided with a pair of opposed line receptors 291 for gripping the inner end portion 17" of two separate lengths of cutting line 17. Spool 216 is sized and configured such that the upper flange 270 thereon is in planar alignment with the eye outlets apertures 278. Each of the line receptors 291, including the line receptor channels 293, comprises the same configurations and functions in the same manner as the line receptors in the prior embodiments. Again, the dimensions may vary slightly depending on the variations in the sizes of the respective spools and the diameter or diameters of cutting line for which the head is designed. The cams, cam abutment surfaces and sliding surfaces described above cooperate in essentially the same manner as the cams, abutment and sliding surfaces in the first embodiment of the bump-feed head to effect the reciprocal movement of the spool within the housing to uniformly distribute the line on the spool. When the spool 216 is gripped by the bumper 281 and rotated in a counterclockwise direction relative to the housing, the lower slide surfaces 257b on the lower cam follower 257 will abut the trailing surfaces 246b on the lower projections 246 causing the spool to translate upwardly with respect to the housing, compressing the coil spring 222. As the manual rotation of the spool continues, the corner portions of the lower cam follower 257 will ride over and clear the projections 246 in the lower portion of the housing whereupon the spring will cause the spool to snap downwardly such that the lower projections and lower cam abutment surfaces are again in planar alignment. Because the upper slide surfaces on the upper projections 244 and the leading (slide) surfaces 256b on the upper cam follower 256 are in abutment to wind the cutting line thereon at the very time the coil spring 222 will snap the spool 216 downwardly, it may prove desirable to incline the trailing surfaces 244b of the upper projections 244 and/or the leading (slide) surfaces 256b of the upper cam follower 256 to provide smoother rotation of the spool with respect to the housing during the loading of the line.

As noted in referenced U.S. Pat. No. 4,959,904, the bump-feed mechanism provided by the cams and cam abutment surfaces need not be limited to square cam followers (or cams as they are referred to in the referenced patent). The same is true of trimmer head 200. The upper and lower cam followers formed the upper and lower spools, for example, could be three or five sided as shown in FIGS. 12-15 of the referenced U.S. Pat. No. 4,959,904. Three and five sided cam followers would cooperate with an equal number of cam abutment members in the upper and lower housings as shown in the referenced drawings. The function, cooperation and operation of such cams and cam followers would be otherwise essentially unchanged from that described above and in the referenced patent.

Various changes and modifications also may be made in carrying out the present invention without departing from the spirit and scope thereof. For example, the spools employed with the present invention could be formed with a single flange and the line would be wound about the spool body between that flange and a portion of the housing. The line receptor or receptors would continue to be provided in the single flange. Insofar as these and other changes and modifications are within the purview of the appended claims, they are to be considered as part of the present invention.

What is claimed is:

1. A trimmer head for use with at least one length of flexible cutting line in a flexible line rotary trimmer, said head comprising:
   a housing adapted to be operatively connected to a rotary trimmer to effect rotation of said head, said housing defining a cylindrical depending skirt having at least one line outlet opening therein;
   a spool operatively connected to said housing for rotation therewith about a common axis in a drive mode and for rotation with respect to said housing in a line winding mode, said spool including a cylindrical body portion and at least one flange projecting radially therefrom so as to define a cutting line storage area about said body portion adjacent to said flange, the operative connection between said spool and said housing effecting reciprocal movement between said spool and said housing along said common axis of rotation upon rotation of said spool with respect to said housing in the line winding mode; and
   at least one line receptor formed in said flange, said receptor including an inwardly extending channel, said channel defining an outer end alignable with said line outlet opening in said skirt upon relative rotation of said spool and said housing and wherein at least an outer portion of said channel is polygonal in cross-section for gripping a length of cutting line upon an end portion of the line being inserted into said channel through said line outlet opening, a portion of the line extending from said channel being directed toward said body portion of said spool as said spool is rotated with respect to said housing.

2. The trimmer head of claim 1 wherein at least said outer portion of said channel in said receptor is hexagonal in cross-section.

3. The trimmer head of claim 2 wherein at least an inner portion of said channel in said receptor tapers inwardly.

4. The trimmer head of claim 1 wherein at least an inner portion of said channel in said receptor tapers inwardly.

5. The trimmer head of claim 1 including a line guide surface adjacent to said outer end of said channel for directing the portion of the line extending from said channel inwardly toward said body portion of said spool.

6. The trimmer head of claim 5 wherein said channel defines a linear central axis and wherein at least a portion of said line guide surface adjacent to said outer end of said channel in said line receptor is linear and defines a central longitudinal axis extending therealong and intersecting said central axis of said channel.

7. The trimmer head of claim 5 wherein a first portion of said line guide surface adjacent to said outer end of said channel in said line receptor extends laterally from said outer end of said channel and a second portion of said line guide surface extends laterally and inwardly from said first portion.

8. The trimmer head of claim 5 wherein at least a portion of said line guide surface adjacent to said outer end of said channel in said line receptor is linear and defines a central longitudinal axis extending therealong and wherein at least said outer portion of said channel is formed by a plurality of converging walls so as to define a corresponding plurality of channel corners, said channel being oriented such that said longitudinal axis of said portion of said guide surface intersects a linear central axis of said channel and at least one of said channel corners.

9. The trimmer head of claim 8 wherein at least said outer portion of said channel in said receptor is hexagonal in cross-section.

10. The trimmer head of claim 8 wherein at least said outer portion of said channel in said receptor is diamond-shaped in cross-section.

11. The trimmer head of claim 8 wherein at least said outer portion of said channel in said receptor is triangularly-shaped in cross-section.

12. The trimmer head of claim 8 wherein at least an inner portion of said channel in said receptor tapers inwardly.

13. The trimmer head of claim 8 wherein said central axis of said channel additionally defines an acute angle with respect to said longitudinal axis of said portion of said guide surface.

14. The trimmer head of claim 1 wherein said channel defines a linear central axis and extends radially through said line receptor such that said central axis thereof intersects said common axis.

15. The trimmer head of claim 1 wherein said channel defines a linear central axis, said axis forming an acute angle with respect to a line tangent to said flange at said outer end of said channel.

16. The trimmer head of claim 1 wherein at least said outer portion of said channel in said receptor is diamond-shaped in cross-section.

17. The trimmer head of claim 1 wherein at least said outer portion of said channel in said receptor is triangularly-shaped in cross-section.

18. A trimmer head for use with at least one length of flexible cutting line in a flexible line rotary trimmer, said head comprising:

a housing adapted to be operatively connected to a rotary trimmer to effect rotation of said head, said housing defining a cylindrical depending skirt having at least one line outlet opening therein;

a spool operatively connected to said housing for rotation therewith about a common axis in a drive mode and for rotation with respect to said housing in a line winding mode, said spool including a cylindrical body portion and at least one flange projecting radially therefrom so as to define a cutting line storage area about said body portion adjacent to said flange, the operative connection between said spool and said housing effecting reciprocal movement between said spool and said housing along said common axis of rotation upon rotation of said spool with respect to said housing in the line winding mode; and at least one line receptor formed in said flange, said receptor including an inwardly extending channel, said channel defining an outer end alignable with said line outlet opening in said skirt upon relative rotation of said spool and said housing and being generally oval-shaped in cross-section so as to define a major transverse axis, a minor transverse axis and a linear central axis normal to said major and minor axes and wherein said line receptor additionally includes a line guide surface adjacent said outer end of said channel for directing line extending from said channel toward said body portion of said spool, at least a portion of said line guide surface adjacent said outer end of said channel being linear and defining a central longitudinal axis extending therealong, said central longitudinal axis being at least substantially coincident with said minor axis of said channel at said outer end of said channel for gripping a length of cutting line upon an end portion of said line being inserted into said channel through said line outlet opening and a portion of the line extending from said channel being directed against said guide surface and toward said body portion of said spool as said spool is rotated with respect to said housing.

19. The trimmer head of claim 18 wherein at least an inner portion of said channel tapers inwardly for holding a plurality of sizes of cutting line within said channel.

20. A trimmer head for use with at least one length of flexible cutting line in a flexible line rotary trimmer, said head comprising:

a housing adapted to be operatively connected to a rotary trimmer to effect rotation of said head, said housing defining a cylindrical depending skirt having at least one line outlet opening therein;

a spool operatively connected to said housing for rotation therewith in a first direction about a common axis in a drive mode and for rotation with respect to said housing in said first direction a line winding mode, said spool including a cylindrical body portion and at least one flange projecting radially therefrom so as to define a cutting line storage area about said body portion adjacent said flange, the operative connection between said spool and said housing effecting reciprocal movement between said spool and said housing along said common axis of rotation upon rotation of said spool with respect to said housing in said first direction in the line winding mode; and at least one line receptor formed in said flange, said receptor including an inwardly extending walled channel and a line guide surface adjacent to said channel, said channel defining a linear central axis, at least an outer portion of said channel being polygonal in cross-section so as to define a plurality of channel corners and having an outer end alignable with said line outlet opening in said skirt upon relative rotation of said spool and said housing, and wherein at least a portion of said line guide surface adjacent to said outer end of said channel is linear and defines a central longitudinal axis extending through said central axis of said channel and at least one of said channel corners whereby upon inserting an end portion of a length of flexible cutting line into said channel in said line receptor, directing a portion of the line extending from said channel against said guide surface and toward said body portion of said spool and rotating said spool with respect to said housing in said first direction, said end portion of said line is held by said walled channel and the length of line is pulled inwardly through said outlet opening in the housing skirt and toward said body portion of said spool and wound about said body portion as said spool is concurrently rotated and reciprocated with respect to said housing.

21. The trimmer head of claim 20 wherein at least said outer portion of said channel in said receptor is hexagonal in cross-section.

22. The trimmer head of claim 21 wherein at least an inner portion of said channel in said receptor tapers inwardly.

23. The trimmer head of claim 20 wherein at least an outer portion of said channel in said receptor is diamond-shaped in cross-section.

24. The trimmer head of claim 23 wherein at least an inner portion of said channel in said receptor tapers inwardly.

25. The trimmer head of claim 20 wherein at least an outer portion of said channel in said receptor is triangularly-shaped in cross-section.

26. The trimmer head of claim 25 wherein at least an inner portion of said channel in said receptor tapers inwardly.

27. A trimmer head for use with at least one length of flexible cutting line in a flexible line rotary trimmer, said head comprising:

a housing adapted to be operatively connected to a rotary trimmer to effect rotation of said head, said housing defining a cylindrical depending skirt having at least one line outlet opening therein;

a spool operatively connected to said housing for rotation therewith about a common axis in a drive mode and for rotation with respect to said housing in a line winding mode, said spool including a cylindrical body portion and at least one flange projecting radially therefrom so as to define a cutting line storage area about said body portion adjacent to said flange, the operative connection between said spool and said housing effecting reciprocal movement between said spool and said housing along said common axis of rotation upon rotation of said spool with respect to said housing in the line winding mode; and at least one line receptor formed in said flange, said receptor including an inwardly extending linear channel, said channel defining an outer end alignable with said line outlet opening in said skirt upon relative rotation of said spool and said housing and wherein at least an outer portion of said channel defines a cross-section configured so as to grip a length of cutting line upon an end portion of the line being inserted into said channel through said line outlet opening and a portion of the line extending from said channel being directed toward said body portion of said spool as said spool is rotated with respect to said housing.

28. A trimmer head for use with at least one length of flexible cutting line in a flexible line rotary trimmer, said head comprising:

a housing adapted to be operatively connected to a rotary trimmer to effect rotation of said head, said housing defining a cylindrical depending skirt having at least one line outlet opening therein;

a spool operatively connected to said housing for rotation therewith about a common axis in a drive mode and for rotation with respect to said housing in a line winding mode, said spool including a cylindrical body portion and at least one flange projecting radially therefrom so as to define a cutting line storage area about said body portion adjacent to said flange, the operative connection between said spool and said housing effecting reciprocal movement between said spool and said housing alone said common axis of rotation upon rotation of said spool with respect to said housing in the line winding mode; and at least one line receptor formed in said flange, said receptor including an inwardly extending channel, said channel defining an outer end alignable with said line outlet opening in said skirt upon relative rotation of said spool and said housing and wherein at least an outer portion of said channel defines a cross-section configured so as to grip a length of cutting line upon an end portion of the line being inserted into said channel through said line outlet opening and a portion of the line extending from said channel being directed toward said body portion of said spool as said spool is rotated with respect to said housing and wherein at least an inner portion of said channel in said receptor tapers inwardly for holding a plurality of sizes of cutting line within said channel.

29. The trimmer head of claim 27 wherein at least said outer portion of said channel is hexagonal in cross-section and wherein each said line receptor additionally includes a line guide surface adjacent to said outer end of said channel for directing the portion of the line extending from said channel inwardly toward said body portion of said spool.

30. The trimmer head of claim 29 wherein said guide surface comprises a first portion adjacent to said outer end of said channel and extending laterally therefrom and a second portion adjacent to said first portion and extending laterally and inwardly therefrom.

31. The trimmer head of claim 27 wherein said reciprocating means includes the operative connection between said spool and said housing and comprises a plurality of equiangularly spaced projections on either said spool or said housing and a corresponding plurality of apertures formed in either said housing or said spool for receiving said projections, each of said apertures defining a leading wall portion and a trailing wall portion, said leading wall portions having a greater axial length than said trailing wall portions, a spring member urging said projections into said apertures such that rotation of said head in said first direction causes said projections to bear against said leading wall portions of said apertures and effect corresponding rotation of said spool in said first direction, and a corresponding plurality of inclined arcuate ramps, each of said ramps extending from a location proximate one of said apertures in an arcuate inclined path to a trailing wall surface of another of said apertures such that as said spool is rotating with respect to said housing in said first direction, said projections repeatedly ride over said trailing wall portions of said apertures, along an adjacent inclined ramp and, under the force of said spring member into another aperture so as to cause a reciprocating movement of said spool with respect to said housing along said common axis.

32. The trimmer head of claim 27 wherein said head is of the type adapted to be bumped against the ground to effect the feeding of predetermined lengths of line and further comprises vertically aligned, similarly shaped and rotationally offset upper and lower cams operatively connected to said housing for rotation therewith, each of said cams defining a plurality of cam surfaces thereon, and a cam follower assembly operatively connected to said spool for rotation therewith and defining a plurality of cam abutment surfaces adapted to selectively engage said cam surfaces in predetermined rotational increments in response to the striking of said head on the ground so as to cause the spool to translate vertically within the housing while said head and spool are rotating in said first direction, whereby relative rotation is produced between said spool and said housing to effect the feeding of predetermined lengths of line outwardly through said line outlet openings in said housing, and wherein at least one of said cams and said cam follower assembly define a sliding surface adjacent and angularly offset with respect to each of said cam surfaces and said cam abutment surfaces thereon so as to allow said spool to be rotated in said first direction with respect to said housing and effect the reciprocating movement of said spool with respect to said housing as said line is wound on said spool.

33. A trimmer head for use with at least one length of flexible cutting line in a flexible line rotary trimmer, said head comprising:

a housing adapted to be operatively connected to a rotary trimmer to effect rotation of said head, said housing defining a cylindrical depending skirt having at least one line outlet opening therein;

a spool operatively connected to said housing for rotation therewith about a common axis in a drive mode and for rotation with respect to said housing in a line winding mode, said spool including a cylindrical body portion and at least one flange projecting radially therefrom so as to define a cutting line storage area about said body portion adjacent to said flange; and at least one line receptor formed in said flange, said receptor including an inwardly extending channel, said channel defining an outer end alignable with said line outlet opening in said skirt upon relative rotation of said spool and said housing and being generally oval-shaped in cross-section so as to define a major transverse axis, a minor transverse axis and a linear central axis normal to said major and minor axes and wherein said line receptor additionally includes a line guide surface adjacent said outer end of said channel for directing line extending from said channel inwardly toward said body portion of said spool, at least a portion of said line guide surface adjacent said outer end of said channel being linear and defining a central longitudinal axis extending thereal-ong, said central longitudinal axis being at least substantially coincident with said minor axis of said channel at said outer end of said channel for gripping a length of cutting line upon an end portion of said line being inserted into said channel through said line outlet opening and a portion of the line extending from said channel being directed against said guide surface and toward said body portion of said spool as said spool is rotated with respect to said housing.

34. The trimmer head of claim 33 wherein at least an inner portion of said channel tapers inwardly for holding a plurality of sizes of cutting line within said channel.

35. A trimmer head for use with at least one length of flexible cutting line in a flexible line rotary trimmer, said head comprising:

a housing adapted to be operatively connected to a rotary trimmer to effect rotation of said head, said housing defining a cylindrical depending skirt having at least one line outlet opening therein;

a spool operatively connected to said housing for rotation therewith about a common axis in a drive mode and for rotation with respect to said housing in a line winding mode, said spool including a cylindrical body portion and at least one flange projecting radially therefrom so as to define a cutting line storage area about said body portion adjacent to said flange; and at least one line receptor formed in said flange, said receptor including an inwardly extending channel, said channel defining an outer end alignable with said line outlet opening in said skirt upon relative rotation of said spool and said housing and being generally oval-shaped in cross-section so as to define a major transverse axis, a minor transverse axis and a linear central axis normal to said major and minor axes, said channel gripping a length of cutting line upon an end portion of said line being inserted into said channel through said line outlet opening and a portion of the line extending from said channel being directed along a path at least substantially coincident with said minor axis of said channel and toward said body portion of said spool as said spool is rotated with respect to said housing.

36. The trimmer head of claim 35 wherein at least an inner portion of said channel tapers inwardly for holding a plurality of sizes of cutting line within said channel.

37. A trimmer head for use with at least one length of flexible cutting line in a flexible line rotary trimmer, said head comprising:

a housing adapted to be operatively connected to a rotary trimmer to effect rotation of said head, said housing defining a cylindrical depending skirt having at least one line outlet opening therein;

a spool operatively connected to said housing for rotation therewith about a common axis in a drive mode and for rotation with respect to said housing in a line winding mode, said spool including a cylindrical body portion and at least one flange projecting radially therefrom so as to define a cutting line storage area about said body portion adjacent to said flange; and at least one line receptor formed in said flange, said receptor including an inwardly extending linear channel, said channel defining an outer end alignable with said line outlet opening in said skirt upon relative rotation of said spool and said housing and wherein at least an outer portion of said channel defines a cross-section configured so as to grip a length of cutting line upon an end portion of the line being inserted into said channel through said line outlet opening and a portion of the line extending from said channel being directed toward said body portion of said spool as said spool is rotated with respect to said housing.

38. The trimmer head of claim 37 wherein said inwardly extending linear channel defines a central axis extending radially inwardly so as to intersect said common axis.

39. The trimmer head of claim 37 including a line guide surface adjacent said outer end of said channel and extending from said outer end of said channel for directing line extending from said channel toward said body portion of said spool.

40. The trimmer head of claim 39 wherein the operative connection between said spool and said housing effects reciprocal movement between said spool and said housing along said common axis of rotation upon rotation of said spool with respect to said housing in the line winding mode.

41. A trimmer head for use with at least one length of flexible cutting line in a flexible line rotary trimmer, said head comprising:

a housing adapted to be operatively connected to a rotary trimmer to effect rotation of said head, said housing defining a cylindrical depending skirt having at least one line outlet opening therein;

a spool operatively connected to said housing for rotation therewith about a common axis in a drive mode and for rotation with respect to said housing in a line winding mode, said spool including a cylindrical body portion and at least one flange projecting radially therefrom so as to define a cutting line storage area about said body portion adjacent to said flange; and at least one line receptor formed in said flange, said receptor including an inwardly extending channel, said channel defining an outer end alignable with said line outlet opening in said skirt upon relative rotation of said spool and said housing and wherein at least an outer portion of said channel defines a cross-section configured so as to grip a length of cutting line upon an end portion of the line being inserted into said channel through said line outlet opening and a portion of the line extending from said channel being directed toward said body portion of said spool as said spool is rotated with respect to said housing and wherein at least an inner portion of said channel in said receptor tapers inwardly for holding a plurality of sizes of cutting line within said channel.

42. The trimmer head of claim 41 including a line guide surface adjacent said outer end of said channel and extending from said outer end of said channel for directing line extending from said channel toward said body portion of said spool.

43. The trimmer head of claim 42 wherein the operative connection between said spool and said housing effects reciprocal movement between said spool and said housing along said common axis of rotation upon rotation of said spool with respect to said housing in the line winding mode.

44. The trimmer head of claim 41 wherein said inwardly extending channel defines a central axis extending radially inwardly so as to intersect said common axis.

45. A trimmer head for use with at least one length of flexible cutting line in a flexible line rotary trimmer, said head comprising:

a housing adapted to be operatively connected to a rotary trimmer to effect rotation of said head, said housing defining a cylindrical depending skirt having at least one line outlet opening therein;

a spool operatively connected to said housing for rotation therewith in a first direction about a common axis in a drive mode and for rotation with respect to said housing in said first direction in a line winding mode, said spool including a cylindrical body portion, and at least one flange projecting radially therefrom so as to define a cutting line storage area about said body portion adjacent said flange; and at least one line receptor formed in said flange, said receptor including an inwardly extending walled linear channel, said channel defining an outer end alignable with said line outlet opening in said skirt upon relative rotation of said spool and said housing and wherein the channel wall defines a line engaging surface extending about and longitudinally along at least an outer portion of said channel for gripping a length of cutting line upon an end portion of said line being inserted into said channel through said line outlet opening and a portion of the line extending from said channel being directed toward said body portion of said spool as said spool is rotated with respect to said housing.

46. The trimmer head of claim 45 wherein the operative connection between said spool and said housing effects reciprocal movement between said spool and said housing along said common axis of rotation upon rotation of said spool with respect to said housing in the line winding mode.

47. The trimmer head of claim 46 wherein at least an inner portion of said channel in said receptor tapers inwardly for holding a plurality of sizes of cutting line within said channel.

48. The trimmer head of claim 45 wherein said channel in said receptor is of a substantially uniform transverse dimension at least along said outer portion of said channel.

49. The trimmer head of claim 45 wherein said inwardly extending linear channel defines a central axis extending radially inwardly so as to intersect said common axis.

50. A trimmer head for use with at least one length of flexible cutting line in a flexible line rotary trimmer, said head comprising:
    a housing adapted to be operatively connected to a rotary trimmer to effect rotation of said head, said housing defining a cylindrical depending skirt having at least one line outlet opening therein;
    a spool operatively connected to said housing for rotation therewith in a first direction about a common axis in a drive mode and for rotation with respect to said housing in said first direction in a line winding mode, said spool including a cylindrical body portion, and at least one flange projecting radially therefrom so as to define a cutting line storage area about said body portion adjacent said flange; and
    at least one line receptor formed in said flange, said receptor including an inwardly extending walled channel, said channel defining an outer end alignable with said line outlet opening in said skirt upon relative rotation of said spool and said housing and wherein the channel wall defines a line engaging surface extending about and longitudinally along at least an outer portion of said channel for gripping a length of cutting line upon an end portion of said line being inserted into said channel through said line outlet opening and a portion of the line extending from said channel being directed toward said body portion of said spool as said spool is rotated with respect to said housing and wherein at least an inner portion of said channel in said receptor tapers inwardly for holding a plurality of sizes of cutting line within said channel.

51. The trimmer head of claim 50 wherein said inwardly extending channel defines a central axis extending radially inwardly so as to intersect said common axis.

52. A trimmer head for use with at least one length of flexible cutting line in a flexible line rotary trimmer, said head comprising:
    a housing adapted to be operatively connected to a rotary trimmer to effect rotation of said head, said housing defining a cylindrical depending skirt having at least one line outlet opening therein;
    a spool operatively connected to said housing for rotation therewith in a first direction about a common axis in a drive mode and for rotation with respect to said housing in said first direction in a line winding mode, said spool including a cylindrical body portion, and at least one flange projecting radially therefrom so as to define a cutting line storage area about said body portion adjacent said flange; and
    at least one line receptor formed in said flange, said receptor including an inwardly extending walled channel, said channel defining a linear central axis normal to said common axis and an outer end alignable with said line outlet opening in said skirt upon relative rotation of said spool and said housing and wherein the channel wall defines a line engaging surface extending about and longitudinally along at least an outer portion of said channel for gripping a length of cutting line upon an end portion of said line being inserted into said channel through said line outlet opening and a portion of the line extending from said channel being directed toward said body portion of said spool as said spool is rotated with respect to said housing and wherein said line receptor additionally includes a line guide surface adjacent said outer end of said channel and extending from said outer end of said channel for directing line extending from said channel toward said body portion of said spool.

53. The trimmer head of claim 52 wherein at least an inner portion of said channel in said receptor tapers inwardly for holding a plurality of sizes of cutting line within said channel.

54. The trimmer head of claim 52 wherein the operative connection between said spool and said housing effects reciprocal movement between said spool and said housing along said common axis of rotation upon rotation of said spool with respect to said housing in the line winding mode.

55. The trimmer head of claim 54 wherein at least an inner portion of said channel in said receptor tapers inwardly for holding a plurality of sizes of cutting line within said channel.

\* \* \* \* \*